(12) United States Patent
Lemmons et al.

(10) Patent No.: US 8,932,136 B2
(45) Date of Patent: Jan. 13, 2015

(54) METHOD AND SYSTEM FOR INITIATING AN INTERACTIVE GAME

(75) Inventors: Thomas Lemmons, Evergreen, CO (US); Ian Zenoni, Highlands Ranch, CO (US); Thomas Huber, Parker, CO (US); Steven O. Markel, Highlands Ranch, CO (US); Mark Margaretten, Denver, CO (US); Steven Reynolds, Littleton, CO (US); Joel Hassell, Golden, CO (US)

(73) Assignee: OpenTV, Inc., San Francisco, CA (US)

(*) Notice: Subject to any disclaimer, the term of this patent is extended or adjusted under 35 U.S.C. 154(b) by 462 days.

(21) Appl. No.: 09/939,306

(22) Filed: Aug. 24, 2001

(65) Prior Publication Data

US 2002/0034980 A1 Mar. 21, 2002

Related U.S. Application Data

(60) Provisional application No. 60/227,994, filed on Aug. 25, 2000.

(51) Int. Cl.
*A63F 13/00* (2014.01)
*G06F 17/00* (2006.01)
(Continued)

(52) U.S. Cl.
CPC .......... *A63F 3/081* (2013.01); *A63F 2003/083* (2013.01); *A63F 2003/086* (2013.01); *A63F 2300/409* (2013.01); *A63F 2300/50* (2013.01); *A63F 2300/807* (2013.01)
USPC ...... 463/40; 463/1; 463/41; 463/42; 725/139; 348/14.03

(58) Field of Classification Search
USPC ......... 463/1, 40–42; 725/139; 348/14.03, 552
See application file for complete search history.

(56) References Cited

U.S. PATENT DOCUMENTS 4,372,558 A * 2/1983 Shimamoto et al. ............ 463/41
4,918,603 A   4/1990 Hughes et al.
(Continued)

FOREIGN PATENT DOCUMENTS

EP    1104686       6/2001
GB    2347332 A    8/2000
(Continued)

OTHER PUBLICATIONS

Greenhalgh et al., Creating a Live Broadcast from a Virtual Environment, Computer Graphics Proceedings, Annual conference Series, 1999, pp. 375-382.*

(Continued)

*Primary Examiner* — William H McCulloch, Jr.
(74) *Attorney, Agent, or Firm* — Schwegman Lundberg & Woessner, P.A.

(57) ABSTRACT

The present invention is an interactive system and method whereby participants may engage in a contest that is simultaneously or subsequently broadcast. The broadcast signal may be for the purpose of a pure entertainment source or may be an enticement to play the shown or other interactive games. The games may be computer simulation games, role-playing games, strategy games, question and answer games, casino games, or other games as desired. The broadcast signals may show a specialized view of the game being played and may contain live commentary or other enhancements. The games may be played with set top boxes connected to a television, a broadcast network, and a server system.

49 Claims, 10 Drawing Sheets

(51) Int. Cl.
*G06F 19/00* (2011.01)
*H04N 7/08* (2006.01)
*H04N 7/173* (2011.01)
*A63F 3/08* (2006.01)

(56) References Cited

U.S. PATENT DOCUMENTS

| | | | |
|---|---|---|---|
| 5,083,271 A * | 1/1992 | Thacher et al. | 700/92 |
| 5,263,723 A | 11/1993 | Pearson et al. | |
| 5,411,259 A * | 5/1995 | Pearson et al. | 463/36 |
| RE35,314 E * | 8/1996 | Logg | 463/2 |
| 5,553,864 A * | 9/1996 | Sitrick | 463/31 |
| 5,600,368 A * | 2/1997 | Matthews, III | 348/143 |
| 5,630,757 A * | 5/1997 | Gagin et al. | 463/43 |
| 5,769,714 A * | 6/1998 | Wiener et al. | 463/3 |
| 5,779,549 A * | 7/1998 | Walker et al. | 463/42 |
| 5,846,132 A | 12/1998 | Junkin | |
| 5,860,862 A | 1/1999 | Junkin | |
| 5,885,156 A * | 3/1999 | Toyohara et al. | 463/1 |
| 5,901,956 A * | 5/1999 | Warmack | 273/244 |
| 5,905,988 A | 5/1999 | Schwartz et al. | |
| 5,956,038 A * | 9/1999 | Rekimoto | 345/419 |
| 5,956,485 A * | 9/1999 | Perlman | 709/204 |
| 5,970,143 A | 10/1999 | Schneier et al. | |
| 5,971,397 A * | 10/1999 | Miguel et al. | 273/371 |
| 5,971,854 A | 10/1999 | Pearson et al. | |
| 6,015,344 A | 1/2000 | Kelly et al. | |
| 6,020,875 A * | 2/2000 | Moore et al. | 345/156 |
| 6,056,640 A * | 5/2000 | Schaaij | 463/4 |
| 6,067,077 A * | 5/2000 | Martin et al. | 345/161 |
| 6,080,063 A * | 6/2000 | Khosla | 463/42 |
| 6,135,881 A | 10/2000 | Abbott et al. | |
| 6,179,713 B1 * | 1/2001 | James et al. | 463/42 |
| 6,227,974 B1 * | 5/2001 | Eilat et al. | 463/40 |
| 6,306,036 B1 * | 10/2001 | Burns et al. | 463/31 |
| 6,335,744 B1 * | 1/2002 | Korilis et al. | 345/835 |
| 6,409,599 B1 * | 6/2002 | Sprout et al. | 463/31 |
| 6,447,396 B1 * | 9/2002 | Galyean et al. | 463/40 |
| 6,508,709 B1 * | 1/2003 | Karmarkar | 463/42 |
| 6,527,638 B1 * | 3/2003 | Walker et al. | 463/25 |
| 6,579,184 B1 * | 6/2003 | Tanskanen | 463/41 |
| 6,632,138 B1 | 10/2003 | Serizawa et al. | |
| 6,659,861 B1 * | 12/2003 | Faris et al. | 463/1 |
| 6,758,754 B1 * | 7/2004 | Lavanchy et al. | 463/42 |
| 6,799,327 B1 * | 9/2004 | Reynolds et al. | 725/42 |
| 6,948,131 B1 * | 9/2005 | Neven et al. | 715/753 |
| 7,020,888 B2 * | 3/2006 | Reynolds et al. | 725/34 |
| 7,039,935 B2 * | 5/2006 | Knudson et al. | 725/42 |
| 7,213,255 B2 * | 5/2007 | Markel et | 725/37 |
| 7,306,522 B2 * | 12/2007 | Silver et al. | 463/41 |
| 7,465,231 B2 * | 12/2008 | Lewin et al. | 463/37 |
| 7,526,723 B2 * | 4/2009 | Markel | 715/719 |
| 7,661,117 B2 * | 2/2010 | Markel | 725/43 |
| 7,782,363 B2 * | 8/2010 | Ortiz | 348/211.8 |
| 7,979,877 B2 * | 7/2011 | Huber et al. | 725/36 |
| 8,397,259 B2 * | 3/2013 | Knudson et al. | 725/42 |
| 8,522,273 B2 * | 8/2013 | Huber et al. | 725/34 |
| 8,527,345 B2 * | 9/2013 | Rothschild et al. | 705/14.53 |
| 8,560,387 B2 * | 10/2013 | Amidon et al. | 705/14.4 |
| 8,645,211 B2 * | 2/2014 | Rothschild | 705/14.55 |
| 2001/0003099 A1 * | 6/2001 | Von Kohorn | 463/40 |
| 2002/0004424 A1 * | 1/2002 | Nelson et al. | 463/42 |
| 2002/0108125 A1 * | 8/2002 | Joao | 725/139 |
| 2002/0129374 A1 * | 9/2002 | Freeman et al. | 725/91 |
| 2003/0051255 A1 * | 3/2003 | Bulman et al. | 725/135 |
| 2003/0058277 A1 * | 3/2003 | Bowman-Amuah | 345/765 |
| 2003/0196164 A1 * | 10/2003 | Gupta et al. | 715/500.1 |
| 2005/0026690 A1 * | 2/2005 | Silver et al. | 463/41 |
| 2008/0120113 A1 * | 5/2008 | Loyall et al. | 704/270 |
| 2009/0030774 A1 * | 1/2009 | Rothschild et al. | 705/10 |

FOREIGN PATENT DOCUMENTS

| | | | | |
|---|---|---|---|---|
| JP | 11194985 A | 7/1999 | | |
| JP | 11244528 A | 9/1999 | | |
| JP | 2000126463 A | 5/2000 | | |
| JP | 2001245271 A | 9/2001 | | |
| JP | 2009173635 A | 8/2009 | | |
| WO | WO-9815329 A1 | 4/1998 | | |
| WO | WO 9900163 A1 * | 1/1999 | | A63F 9/22 |
| WO | WO-9900163 A1 | 1/1999 | | |
| WO | WO-0215995 | 2/2002 | | |
| WO | WO-0215995 A1 | 2/2002 | | |

OTHER PUBLICATIONS

Ladas & Parry International Search Report, Dec. 21, 2001.

"Australian Application Serial No. 2007201891, Examination Report Feb. 10, 2009", 2 pgs.

"International Application Serial No. 2007201891, First Examiner's Report Mailed Jan. 11, 2008", 2 pgs.

Greenhalgh, Chris, et al., "Creating a live broadcast from a virtual environment", International Conference on Computer Graphics and Interactive Technique, Proceedings of the 26th Annual Conference on Computer Graphics and Interactive Techniques, (1999), 375-384.

"Australian Application Serial No. 2001295012, Examiner's First Report mailed Jul. 26, 2005", 3 pgs.

"Australian Application Serial No. 2001295012, Examiner's Second Report mailed Apr. 11, 2007", 2 pgs.

"Australian Application Serial No. 2001295012, Response filed Mar. 30, 2007 to Examiner's Report mailed Jul. 26, 2005", 13 pgs.

"Australian Application Serial No. 2007201891, Response filed Jan. 9, 2009 to Office Action mailed Jan. 11, 2008", 16 pgs.

"Australian Application Serial No. 2007201891, Response filed Sep. 15, 2009 to Examiner's Report mailed Feb. 10, 2009", 7 pgs.

"European Application Serial No. 01975719.4, Examiner's Search Report mailed Nov. 21, 2008", 4 pgs.

"European Application Serial No. 01975719.4, Response filed Mar. 9, 2007 to Search Report mailed Feb. 22, 2007", 4 pgs.

"European Application Serial No. 01975719.4, Response filed Sep. 22, 2009 to Search Report mailed Nov. 21, 2008", 6 pgs.

"European Application Serial No. 01975719.4, Search Report mailed Feb. 22, 2007", 4 pgs.

"International Application Serial No. PCT/US01/41892, International Search Report mailed Dec. 21, 2001", 3 pgs.

"International Application Serial No. PCT/US01/41892, Response filed May 9, 2003 to Written Opinion mailed Mar. 10, 2003", 4 pgs.

"International Application Serial No. PCT/US01/41892, Written Opinion mailed Mar. 10, 2003", 6 pgs.

"International Application Serial No. PCT/US01/41892, International Preliminary Examination Report mailed Aug. 15, 2003", 4 pgs, Date of Completion Jun. 19, 2003.

"Japanese Application Serial No. 2002-520912, Response Filed Aug. 22, 2011 to Office Action mailed May 24, 2011", (w/ English translation of claims), 13 pgs.

"Japanese Application Serial No. 2002-520912, Office Action mailed May 24, 2011", 13.

"Australian Application Serial No. 2007201891, Notice of Allowance mailed Sep. 29, 2009", 1 pg.

"European Application Serial No. 01975719.4, Decision to Grant mailed Mar. 18, 2010", 2 pgs.

"European Application Serial No. 01975719.4, Office Action mailed Oct. 23, 2009", 1 pg.

"European Application Serial No. 01975719.4, Response filed Aug. 21, 2009 to Summons mailed Nov. 21, 2008", 5 pgs.

"European Application Serial No. 01975719.4, Response filed Sep. 3, 2007 to Office Action mailed Feb. 22, 2007", 4 pgs.

"Japanese Application Serial No. 2002-520912, Office Action mailed May 1, 2012", with English translation of claims, 9 pgs.

* cited by examiner

METHOD AND SYSTEM FOR INITIATING AN INTERACTIVE GAME

CROSS REFERENCE TO RELATED APPLICATIONS

The present invention is based upon and claims priority from US provisional application Ser. No. 60/227,994 filed Aug. 25, 2000 entitled "Interactive Fantasy Sports League".

BACKGROUND OF THE INVENTION a. Field of the Invention

The present invention pertains generally to the field of interactive television, and specifically to the play of games via interactive television.

b. Description of the Background

Sports fans have always enjoyed watching and rooting for their favorite team and have not been able to become actively involved in the team or sport. Many fans are referred to as armchair quarterbacks or coaches. Also, many fans participate in a form of the game called fantasy sports where leagues are created and seasons played out in detail.

In the prior art, this participation is directed to a participant picking a number of sports athletes involved in a particular sport. The athletes will make up a participant's team. As each athlete is an actual player playing an actual game in an actual league, the athlete will have statistics based on his or her performance in the actual game. The participant is awarded points based on the statistics of the actual athletes that make up the participant's team.

Several interactive games based on such a fantasy league are taught in the prior art. U.S. Pat. No. 5,846,132 is an interactive game "based on an event which takes place in real time." The event that takes place in real time is an event outside of the scope of the interactive game being played by the participants, to where the participants of the interactive game are subjected to merely guessing what happens in a particular broadcast event, such as a sporting event.

Fantasy sports, such as described above, is generally a test of a participant's intimate knowledge of the individual players in a certain sport and serve as an enhancement to the viewing experience of a sporting event. Fantasy sports, as played interactively, rely on the actions of athletes who do not participate in the interactive game and the fantasy sports are constrained around the schedules of the events that are merely tracked by the fantasy sports. Such fantasy sports rely on events that happen during the course of play of the interactive game by players other than the interactive game participants and are, in essence, elaborate and complex betting pools for the enjoyment of followers of a particular sport. Hence, these types of fantasy sports do not amount to a head-to-head sporting competition that is actually played by the participants. Further, the fantasy sports league is not broadcast to viewers other than the participants, nor would it be interesting to a casual viewer.

It would therefore be advantageous to provide interactive broadcast games whereby the participants of the games play directly against each other, the game is broadcast to viewers in addition to the participants, and the outcome of the game is determined by the actions of the participants and/or by computer generated events. Such interactive games do not rely on the prediction of outside events that occur during the course of the game and, as such, can be played at any time. It would be advantageous for the broadcast games to be interesting to the casual viewer. It would also be advantageous to provide a large selection of games so that many people would be interested in playing.

SUMMARY OF THE INVENTION

The present invention overcomes the disadvantages and limitations of the prior art by providing a broadcast game whereby an interactive participant may enjoy being part of the action of the game by actually participating in the broadcast game, not merely guessing on the outcome of another game over which they have no control. The game may be broadcast as an entertainment source or as an advertisement for the play of such games. The game play may incorporate a broadcast signal as part of the participant's user interface or may be distinctly different. The broadcast signal of the game being played by the participants may be delayed from the real time play and not constrained to coincide with a separate and non-related contest. The game may use several forms of input devices and may take on many forms, including simulation sporting games, role-playing games, strategy games, real time contests, casino games, and other types of games.

In an embodiment of a game that is a sporting simulation game, for example, a participant may control a player in a football game. The game may test the participant's skill, knowledge, and strategy by calling plays against another interactive participant. Further, the game may allow the participant to control the movement and actions of a single player on the football field. In such a contest, the participant's actions and decisions directly affect the broadcast computer generated simulation of a football contest.

In an embodiment of a game that is a role playing game, for example, a participant may move around a virtual world and interact with other participants using a special user interface that is unique to each participant. The broadcast video may have an overview of the entire game as it progresses, or may highlight special events as they unfold.

In an embodiment of a game that is a strategy game, for example, such as one where a participant commands a virtual army in a siege against a virtual city, the participants will move and manage their troops to outsmart the other participant.

In an embodiment of a game that is a casino game, the participant may play a card game at an individual table against other participants. The broadcast video may switch from table to table, showing the action of the participants that are on a winning streak or those that are betting large sums of money.

In an embodiment of a game show, participants may be trying to answer questions in the shortest amount of time to vie for a chance to play for a large sum of money. The game may progress in an elimination format whereby contestants are eliminated round after round until only one is left.

In an embodiment of the invention wherein a tournament is played, participants may compete in a bracket system whereby contestants are eliminated in each round, with a final round or rounds of the tournament being broadcast. Such a tournament may have a virtual Super Bowl for an interactive football tournament.

The present invention may therefore comprise a system for the play of interactive games using broadcast television comprising: a server system operative to generate the game; the server system coupled to a broadcast network for transmitting the game to a plurality of viewer's televisions capable of receiving the computer generated game and displaying same to the viewers; the system adapted to permit at least one of the viewers to interact with the computer generated game by being interactively coupled to the server, such that the server can receive and send transmissions with the viewer; the system operates to initiate a game and permit the viewers desiring to interact with the game to play the computer generated game to an end; and the game being an interactive sports game.

The present invention may therefore further comprise a system for the play of interactive games using broadcast television comprising: at least one set top box connected to an input device and operative to process signals from the input device and generate a real time signal of the game and operative to send and receive messages to a server system; the server system operative to receive and send the messages with the set top box and operative to generate a broadcast signal containing at least a portion of the game; the server system coupled to a broadcast network for transmitting the game to a plurality of viewer's televisions capable of receiving the computer generated game and displaying same to the viewers; the system operates to initiate a game and permit the viewers desiring to interact with the game to play the computer generated game to an end; and the game being an interactive sports game.

The present invention may therefore further comprise a method of playing an interactive broadcast game comprising: displaying a unique user interface on an interactive device for each participant of the broadcast; creating at least one user input through the interactive device; transmitting the user input to a server system over an electronic network; the server system creating a video signal of game play based on the input; broadcasting the video signal over a television network to a plurality of viewer's televisions capable of receiving the video signal and displaying same to the viewers; and the game being an interactive sports game.

The advantages of the present invention are that participants may engage in various forms of contests against each other for the enjoyment and notoriety of being on broadcast television. Tournaments and leagues may be formed for the express end of performing on nationwide television for a final playoff, such as an interactive Super Bowl. The broadcast games may be a commercial advertisement that entices viewers into participating in the interactive games. Television game shows may incorporate live participants from around the world by using the interactive elements of the present invention, drawing a large following since everybody with an interactive television set top box may be eligible to play.

DETAILED DESCRIPTION OF THE INVENTION

Figure 1:
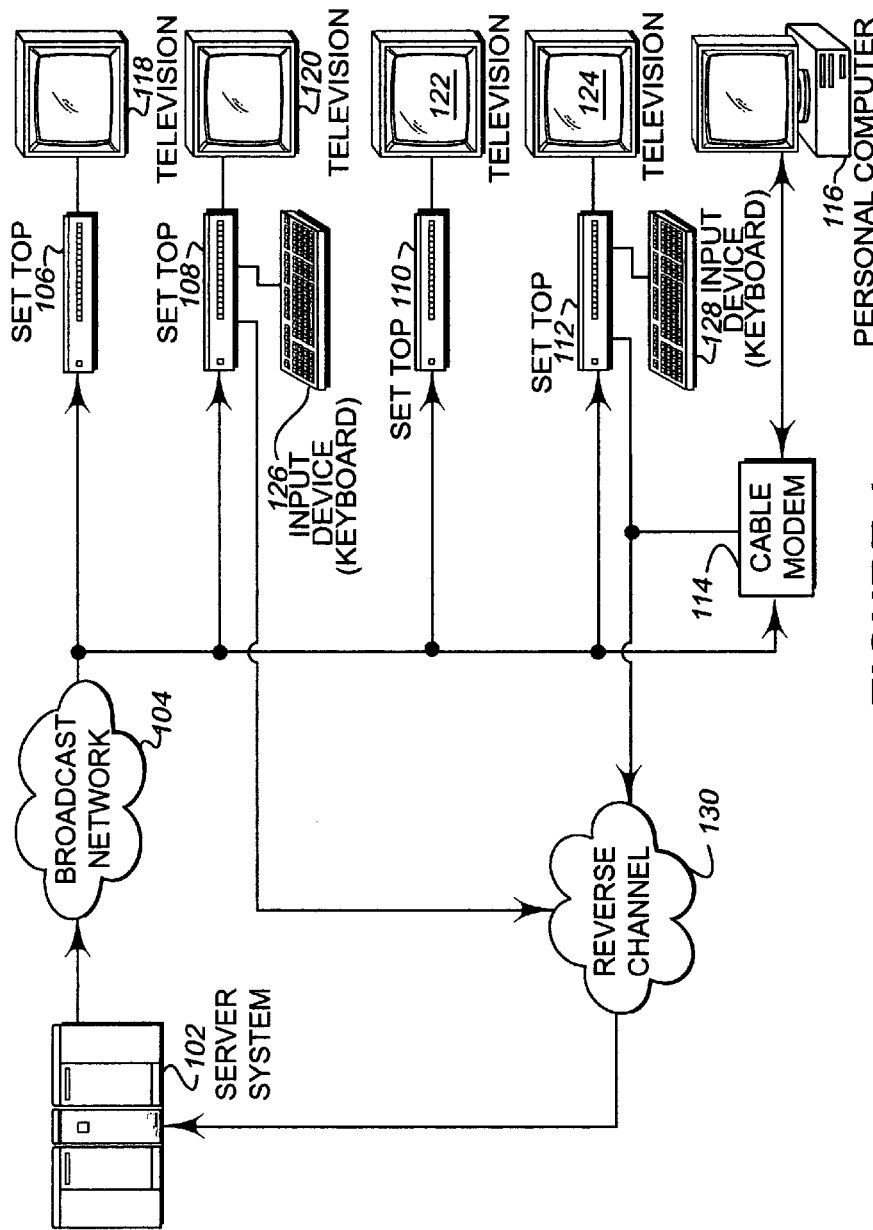
FIG. 1 is a block diagram of an embodiment of the present invention showing a system for playing interactive games.

FIG. 1 illustrates a block diagram of an embodiment of the network system for playing interactive games. The server system 102 generates a signal that is sent to the broadcast network 104, which in turn send the signal to set top boxes 106, 108, 110, and 112. Additionally, the broadcast network 104 sends the signal via cable modem 114 to personal computer 116. Each set top box 106, 108, 110, and 112 are attached to televisions 118, 120, 122, and 124, respectively. Set top boxes 108 and 112 are configured with input devices such as keyboards 126 and 128, respectively. Input devices such as voice recognition systems, remote controls, etc. can be used by a participant to play an interactive game, as disclosed more fully below. User input from the input devices such as keyboards 126 and 128 are sent via set top boxes 108 and 112 to the server system 102 via the reverse channel 130 or a separate channel.

The server system 102 may generate a video signal that can be broadcast live, for the games that may be played in real time. Some games, for example, a trivia contest game or a chess game, may be played over several weeks, with the interactive participants placing their answers once a week, and tuning in the next week to see the results of their plays.

The server system 102 may control the game to be played. The input for the game may come from the reverse channel 130 directly from the participant. The games to be played may vary extensively. Examples of games may comprise simulation games, strategy games, role-playing games, game show contests, casino games, and other games. Those skilled in the art of game creation may create games outside of these examples and still fall within the scope and intent of the present invention.

The broadcast network 104 may be a conventional cable television network, an over the air broadcast network, the Internet, a satellite distribution network, or other broadcast network. The cable television networks and the Internet broadcast networks may incorporate the reverse channel 130 as an integral part of the broadcast network. The reverse channel 130 is the network routing that allows the participant's input to be transmitted to the server system 102. The reverse channel 130 may be a separate channel such as through a telephone line or an Internet connection, a wireless connection, or any other electronic communication method.

The set top box 106 may be a device that can perform several functions in addition to transferring the video signal from the broadcast network 104 to the television 118. In addition to the broadcast signals, the set top box 106 may be capable of receiving signals specifically for the particular viewer of television 118. For example, interactive web pages customized for the viewer of television 118 may be transmitted with and embedded into the broadcast signal. The set top box 106 may then combine the broadcast signal with the web pages and display a customized signal to the viewer of television 118. The set top box 108 is shown with a keyboard 126 attached and with a connection to reverse channel 130. Set top box 108 may be thereby enabled to take a participant's input and transmit it back via the reverse channel 130 to the server system 102. The keyboard 126 may be replaced or supplemented with a remote control, trackball, mouse, joystick, gyroscopic pointing device, dedicated game pad for game play, touch screen, stylus, or other user input device. The input given back through the reverse channel 130 may be a computer commands, such as keyboard inputs and mouse directions. Further, the input may comprise audio, for example, a participant talking into a microphone as part of his or her input to the game. Additionally, a video camera may also be used to capture a video signal and send the video signal through the reverse channel 130 to the server controller 102 to be incorporated into the game.

For the purposes of this specification, the term set top box shall refer to any electronic device used to receive the signals from the broadcast network and transfer them to the television. The electronic device may be incorporated into the television circuitry or may be a physically separate unit. The device may passively condition the signal, such as a passive descrambler, or may have active circuitry for manipulating the signal, such as decoding an embedded HTML page and manipulating the display to show the HTML page as it was designed. Further, the device may have some programmable capability, that can be changed by the participant by installing and running different software, and/or capability that can be changed remotely by a separate computer through an electronic communication. Further, the device may have any type of input device desired, such as keyboard, touch screen, mouse, stylus, joystick, trackball, microphone, live action video camera, still action digital camera, barcode reader, hygrometer, etc. Further, specialized identification devices such as credit card readers, fingerprint readers, etc. may also be attached to the set top box. The input devices may be attached to the set top box by a cable, wireless connection, or may be physically incorporated into the case of the set top box or television. Further, the set top box in this specification may also comprise elements of a personal computer or other computing device attached to an electronic network. The computing device may include devices such as hand held personal digital assistants, cellular phones, Internet appliances, or other devices capable of processing and displaying video signals. The set top box may also comprise specialized game playing equipment especially adapted to the play of computer games. Such equipment may have special processing circuitry for accelerating certain aspects of the computer and video processing of the game.

For the purposes of this specification, the term input device may comprise a keyboard, remote control, touch screen, mouse, stylus, joystick, trackball, pointing device, game pad, microphone, live action video camera, still action digital camera, barcode reader, hygrometer, light sensor, specialized measurement device, or any device that can generate an analog or digital signal that can be used as an input signal. Such analog or digital signals may be generated through the participant's direct actions or may be sensors that detect the environmental conditions or other factors. Input devices may be specialized for specific games, such as a steering wheel, airplane yoke, pedals, foot actuated pads, or other devices. Further, specialized identification and authentication devices such as credit card readers, fingerprint readers, retinal scanners, etc. may also be used as input devices. Additionally, data storage devices, such as floppy disks, memory card, compact disks, DVD disks, zip disks, may also be used as input devices.

In some cases, the set top box 108 may have some processing power wherein some portion of the computer processing of the game play is done at the participant's set top box 108 or computer 116 and another portion is done at the server computer 102. The set top box 108 may be a dedicated game playing electronic device, or may be a multipurpose device for uses in addition to playing games.

The games to be played may require that the participants purchase a software package or license that would be loaded into the set top box. The software package may be in the form of a CD or DVD disk with a program and data files, a read only memory card with software embedded on it, a read only memory card with only the game activation code embedded, or merely a pass code that, when entered into the set top box, authenticates that the participant has paid for the chance to play.

Cable modem 114 is another avenue whereby a participant may view and play a broadcast game. Cable modem 114 is connected to a participant's computer 116. The cable modem 114 allows the computer 116 to receive broadcast and other signals and to transmit signals, including signals through the reverse channel 130 to server system 102. Alternatively, the cable modem 114 may be a dial up modem, digital subscriber line modem, or other connection for a computer to the Internet or other network that connects to the server system 102.

Televisions 118, 120, 122, and 124 may be conventional television sets that display the signal sent to them. The functionality of the set top box 106 may be combined into television 118 as a single electronic device. Further, the functionality of set top box 106 and television 118 may be incorporated into a hand held gaming device, a wireless personal digital assistant, or any other device whereby a broadcast video signal may be displayed.

The signal broadcast through the broadcast network 104 may be a computer generated signal, a live action signal, or a combination of both. Embodiments of the present invention may include completely computer-generated video. Other embodiments may have live action video, such as a live person hosting or commentating on the event. Still more embodiments may include a portion of live action video with some computer generated video. The audio portion of the video signal may incorporate prerecorded audio, computer generated audio, live action audio, or a combination thereof.

Figure 2:
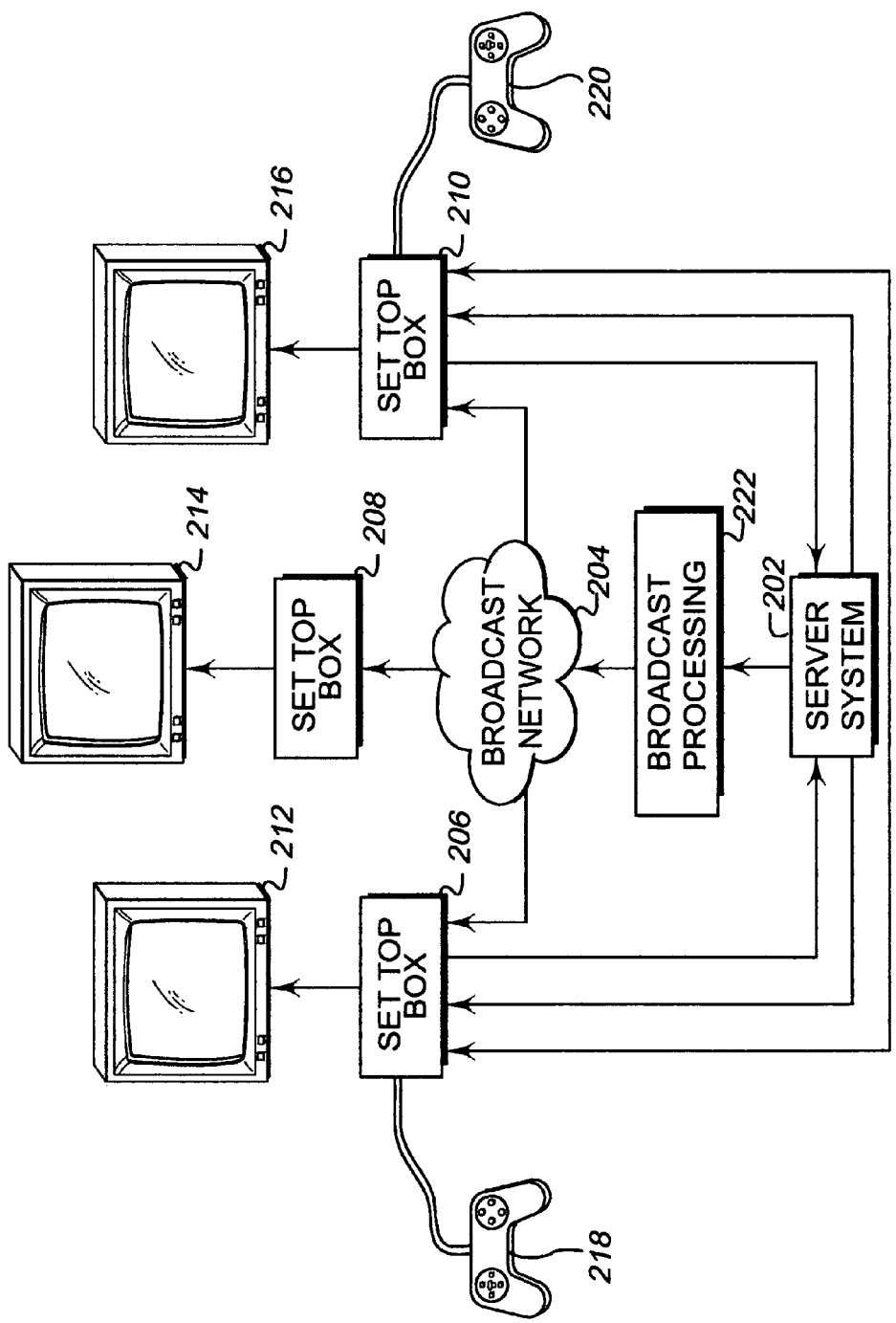
FIG. 2 is a block diagram of a second embodiment of the present invention showing a system for playing interactive games.

FIG. 2 illustrates a block diagram of an embodiment of the present invention showing one set of communication paths between parts of the game playing system. Server system 202 generates a broadcast signal that is sent via the broadcast network 204 to set top boxes 206, 208, and 210. The set top boxes 206, 208, and 210 are connected to televisions 212, 214, and 216, respectively. Set top boxes 206 and 210 have game input devices 218 and 220 attached respectively. The video signal from the server system 202 may be processed by the broadcast processor 222 before sending to the network. The participants of the game may use televisions 212 and 216 and the non-participating viewer may use television 214.

The set top boxes 206 and 210 may have a computational device operational to run special game software. The special software may be adapted to process all of the game functionality, such as taking the participant's input, plus the input of a competing participant, processing that input, and generating a video signal. Set top box 206 may also generate a set of instructions or a signal that can be sent to set top box 210 or to the server system 202 to indicate the actions of the other participant in the game. In this way, the participant using set top box 206 may be playing the game and processing the game locally and only sending a small packet of information to set top box 210 or to server system 202 on a periodic basis. Such a system minimizes the network bandwidth required to play an interactive game and may be adapted to real time live action competition.

The server system 202 may also be running a game processing software that generates the video signal sent over the broadcast network 204. The broadcast game may be the video signal shown on one or both of the televisions 212 or 216 of the participants. Alternatively, the broadcast signal generated by the server system 202 may be compilation of the screens of the participants. The broadcast signal may further be displayed in conjunction with other game elements on the participant's televisions 212 and 216. Further, the broadcast signal may be a completely different view of the game than the participants see. For example, the broadcast view of a football contest may be a side view of the field whereas each participant sees the field from a view that is the vantage point of his team. In another example, the orientation of the broadcast view of the game may be the same as the participants, however, the scores may be shown in a different format, or the scores or other scenes from the game may be shown periodically during the course of the game.

The system server 202 may show a slightly delayed version of the game. The delay may be a few seconds, several minutes, or even several days. On certain types of games, the broadcast video may interfere with the play of the game by the participants, such as in a war game where the participants don't know where each other is located, but the broadcast view may show such information. In other instances, the broadcast video scene may switch from one area of the game to another. Because of the delay in broadcast, if a certain event happens, such as a person is killed in a war game, the event of dying may trigger the broadcast video to be switched to a view of the events that happened before the person dies.

The broadcast signal generated by the server system 202 may be then fed into a live video control room for processing 222 where the signal may be merged with other video signals under the control of a human or automated director. The merged signals may then be sent to the broadcast network. The broadcast signal may further have a live human commentary of the game and the broadcast signal may further have a compilation of live action and computer-generated video. The human director of the broadcast video may select different ongoing games on which to comment or display. For example, if a tournament were being held between many different participants playing games simultaneously, the director may elect to show those games whose scores are very close, or may elect to show highlights of games as they happen, much like sports channels do for professional sporting events. The broadcast processor 222 may be responsible for filling in any dead time of the game, for example, when the participants of a football contest are selecting their next plays, the video may change to an advertisement, a replay of an important portion of the game, a view of the fans in the stands, or some other video.

The server system 202 may also be operable as a hosting device for the game. As a host for the game, the server system 202 may receive streaming inputs from each participant, process those inputs, and send the inputs to the set top boxes 206 and 210 for further processing. During this time, the server system may also generate a video signal that is eventually broadcast. As host, the server system 202 may create the parameters by which the game is played. For example, the server system 202 may create a simulated weather pattern that affects the play of a football contest. In another embodiment, the server system 202 may create a map for a role-playing game that the participants have to negotiate. The parameters set by the server system 202 may be unique to the interactive version of the game, such that the participants are only able to play that specific version of the game using the interactive system. The parameters set by server system 202 may be one-time parameters set at the beginning of the game or may parameters that change over the course of the game.

The server system 202 may be calculating scores or parameters of the participants during the course of the game. The scores of all of the participants may be sent to each participant as part of the information sent from the server system 202 to the set top boxes 206 and 210. Further, the scores may be added to a score database that is a compilation of all scores of all games being played currently and/or have been played in the past. The broadcast video may include a current ranking of the statistics of many participants in the database, not just those engaged in the contest being viewed. For example, in a baseball simulation game, when the participant is up at bat, the statistics for that participant's batting average may be displayed as part of a list of the top ten batting averages in the database.

The software operable in set top box 206 and 210 may be a program whereby the participant may play alone, without communication through a network. The software may be purchased at a retail outlet and come on a compact disk, floppy disk, DVD, embedded read only memory, or other forms. The participant may practice the game at home against a computer-generated opponent or alone until the participant feels confident to test their skills against other human participants. The software purchased at the retail outlet may include a promotion and instructions for interactive play and may include any special software programs needed for interactive play.

The software may also be specially downloaded from the server system 202 for permanent or one time use. The game software may be licensed on a per-use basis, where the participant pays for each time the game is played. The server system 202 may keep track of how many times the game has been played to completion and bill the participant for the number of uses. The downloaded game may be encrypted or keyed to work on a specific set top box, preventing the unlicensed copying and distribution of the game.

In another embodiment of the present invention, the server system 202 may be the only element in the system where the game computation and processing takes place. In such an embodiment, the set top boxes may only capture input signals from the input devices, process the signals, and send the information back to the server system 202. The server system may then create the broadcast signals that would be displayed on all televisions 212, 214, and 216. Such an embodiment may be adapted to games that do not require a high amount of processing and computation. Further, those games that require less live action input may be also suited for such an embodiment. For example, a trivia game contest may be held wherein the participants select an answer from four available answers on the screen. The answers may be then sent to the server system 202 and the results shown.

Figure 3:
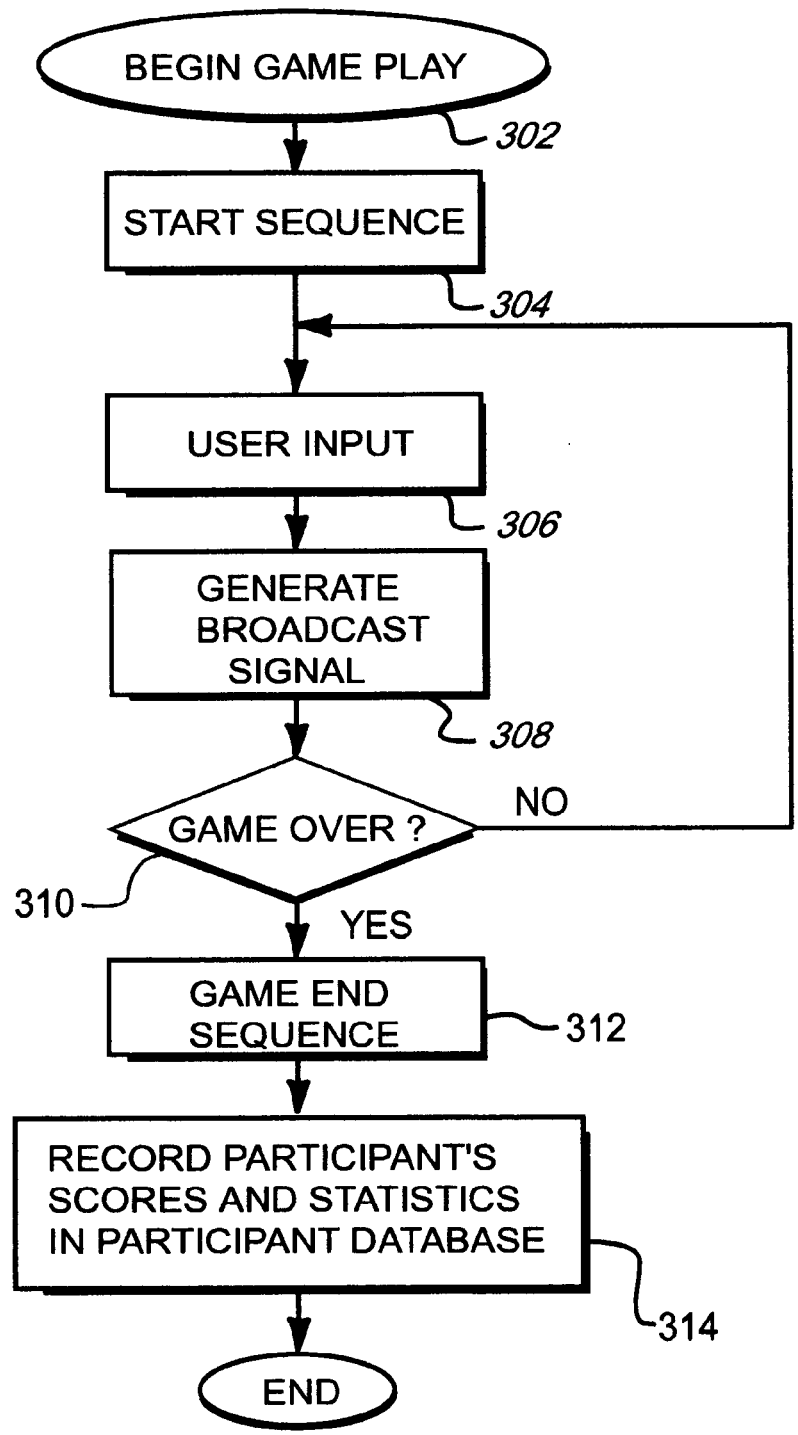
FIG. 3 is a flowchart of a game play sequence of an embodiment of the present invention.

FIG. 3 illustrates a flowchart showing the game play portion of the interaction between the participants. The game play starts at the beginning 302 and enters a start sequence 304 in preparation of the actual game. The user input 306 is taken and a broadcast signal is generated in block 308. If the game is not over in block 310, play continues with the user input 306. When the game is over, the end sequence 312 is executed. As part of the finalizing of the game, the participant's statistics may be recorded in a participant database in block 314.

The beginning of the game 302 is generally started when the contestants are ready to play. Some embodiments for the pre-game activities and sequences of the participants will be discussed hereinafter. When the participants are ready to play, the start sequence 304 for the game will occur. The start sequence 304 obviously will be different for each game and type of game to be played. A start sequence may be a splash screen or introductory video and audio sequence. Such a sequence may include the introduction of each participant or a recitation of their playing history or statistics. Directions for the participants may be broadcast during this time.

The user input 306 to the game may take many different forms. The participant may be asked to use a keyboard, joystick, mouse, or other pointing device to highlight and select their input. The participant may use a pointing device to control the position of an object in the game in real time, such as a car racing game where the participants drive a car around a track. The participant may type in text as input to the game. The participant may use spoken audio commands as input to the game. The participant may use a video camera to capture certain actions as input to the game. The methods of input and the way the input is used in the game will vary with the application. Those skilled in the art may be able to create various embodiments using different inputs and the uses of the inputs without violating the scope and intent of the present invention.

The game play may take on many different forms. Examples of game types include strategy games, role-playing games, skill games, simulation games, game show type games, casino games, team games, and other types of games. The examples contained herein are not to be construed as limiting, but as examples of different elements of the types of games that may be played. Various embodiments of games are contained hereinafter.

The game end sequence 312 may comprise a summary of the game, a splash screen, an award ceremony for the participants, or any other type of conclusion of the game. When the game is complete, or at various times throughout the game, updates may be made to a statistical database of the participants, as shown in block 314. The participant database may be an ongoing log of all of a participant's accomplishments and overall ratings. Further, the database may comprise personal information about the participant, including name, address, age, gender, etc. The database may also include credit card information or bank account information if the game has a financial cost or if the game pays a financial reward.

Figure 4:
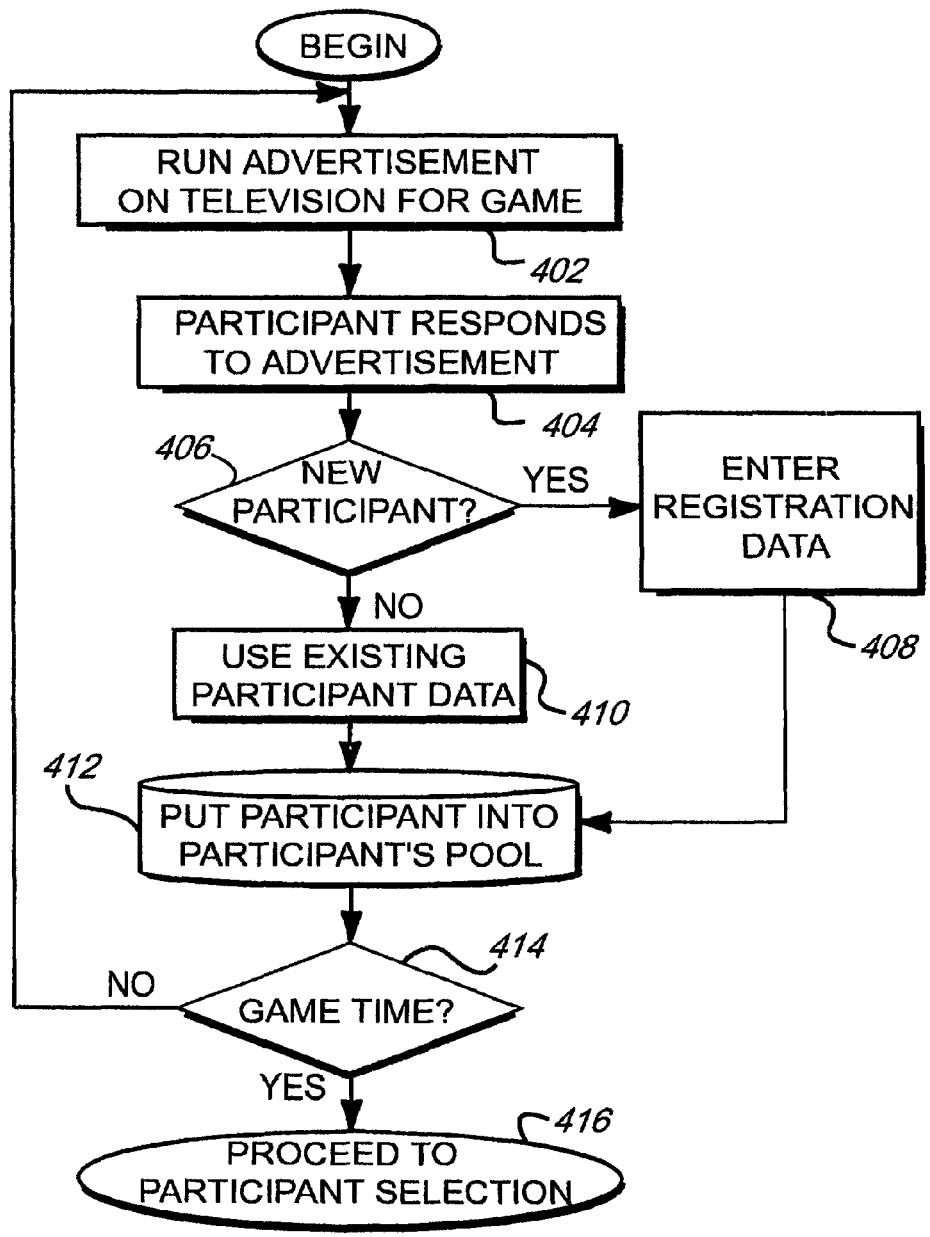
FIG. 4 is a flowchart of a sign up sequence of an embodiment of the present invention.

FIG. 4 illustrates a flowchart of an embodiment wherein a viewer begins the process of becoming a participant in the game. In this embodiment, advertisements for the game appear on television and the viewer is given the opportunity to participate in the upcoming game, as shown in block 402. The viewer may indicate in block 404 that he or she is interested in playing the game and now becomes a participant. The participants may be asked if they are a new participant or returning participant in block 406. If the participant is new, they are asked to enter a series of registration questions in block 408. Returning participants identify themselves and their previous data are used in block 410. When the participants have completed the registration process, they are placed in a participant's pool for the upcoming game in block 412. If game time has not arrived in block 414, the process is repeated. When game time has arrived, the participant selection 416 will begin.

The advertisements on television 402 may take on many forms. Using an interactive television system, a television advertisement may prompt the participant to select the advertisement run on a broadcast channel with a cursor and proceed into the registration process with a special interactive screen. For example, advertisements for an interactive football game may be run during an actual football contest as a scrolling banner at the bottom of the screen while the football game is underway. Alternatively, the interactive game may have a dedicated thirty-second commercial spot run between plays. Advertisements may also be done through email, postal mail, website advertisements, and any other form of advertisement.

The participant responds to the advertisement in block 404. For an interactive television advertisement, the user interface for the response may be the same medium of the advertisement. For other forms of advertisement, the participant may use a website through an interactive television web browser or may use another form of web browser to sign up for the game. The participant may respond by selecting the game to be played from a menu of available games. The menu may be obtained through an interactive television menu, a website, or some other electronic format.

The participant must decide if they are a new participant or returning participant in block 406. For some applications, the participant may be asked if they have played before. In other cases, the participant's identification may be known to the server system automatically, such as through their set top box identification, an authentication system such as a fingerprint identification device attached to the set top box, a software file stored on the set top box or computer through which they are registering for the game, or by any other mechanism of identifying the participant without the participant's express involvement.

If the participant is a new participant, the participant may fill out some questions before playing the game. The questions may be only selecting a screen name, but may also include geographical, demographical, and financial information about the participant. For games that charge a fee for playing, the participant may have to enter a valid credit card number or arrange for some other method of paying for the pleasure of playing the game. Further, the registration information may include information about the participant's ability to play the game, such as their previous experience with the game, a self-ranking evaluation, or other input as may be desired by the game developer.

If the participant is a returning participant, the participant's information may be taken from a database in block 410. Such a database may include the information obtained through the registration process and may also include scores and other statistics about the participant's performance in previous games. The previous performance of the participant may be used in selecting and matching participants for the upcoming game.

The participants may have the option of selecting variables concerning the game to be played. For example, the level of difficulty for the game, parameters relating to length of time, variables concerning the game play including starting parameters, criteria for scoring and other game play variables, parameters for selecting other participants, and other variables may all be changed during this process.

As the participants are being registered, the participants are being added to the participant pool in block 412. The participant pool may be displayed on the participant's screen in the form of individual names or in the form of just a number of people signed up.

The registration process continues until the game time is reached in block 414. In other embodiments, the registration process may proceed until enough participants are obtained to play the desired game, in which case, the game would start immediately or when the scheduled start time arrives. In other embodiments, the registration process may occur until a certain time, then the participants may be assigned game times.

Figure 5:
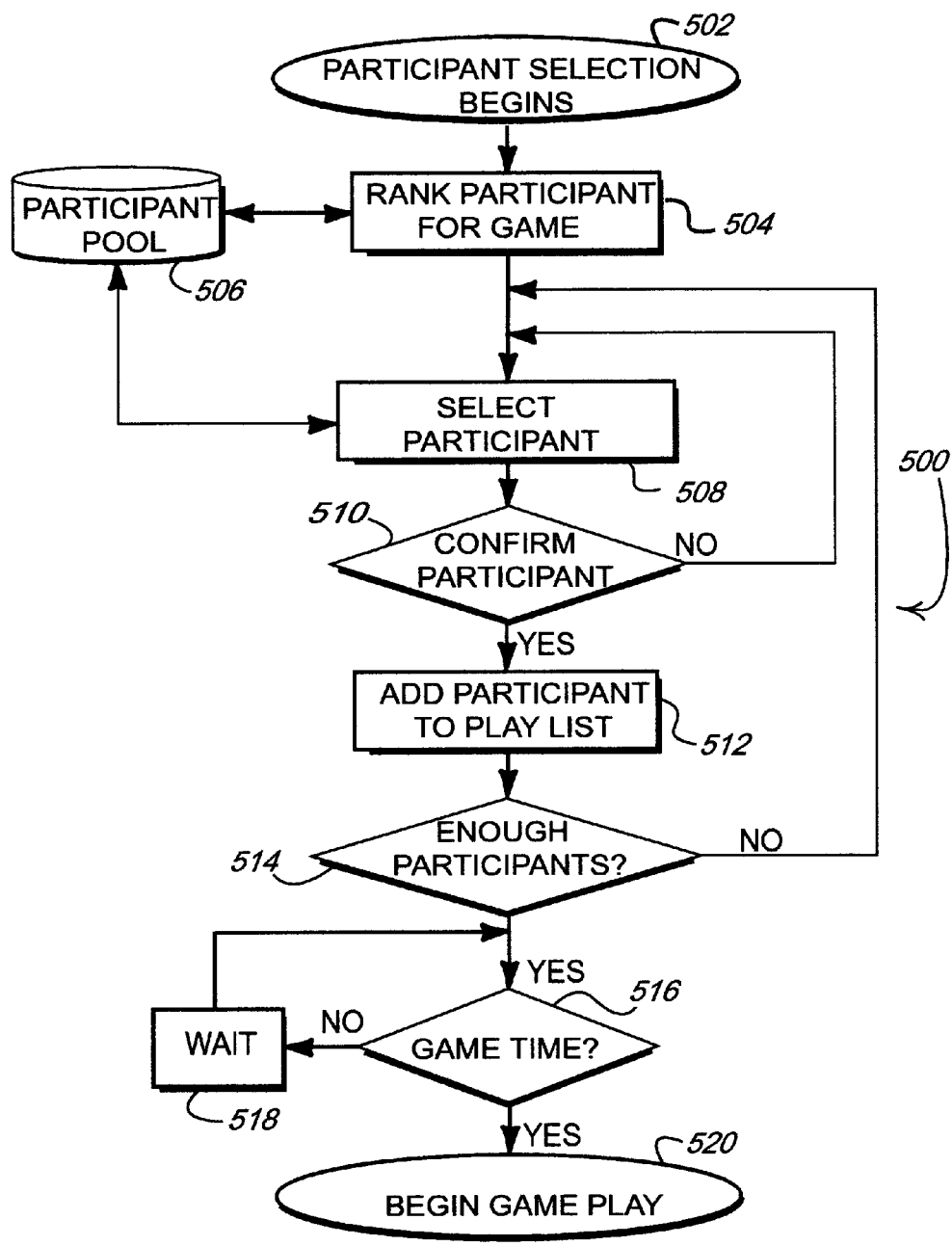
FIG. 5 is a flowchart of a participant selection sequence of an embodiment of the present invention.

FIG. 5 illustrates a flowchart of an embodiment showing a process 500 by which participants may be selected to participate in a game. The process begins in block 502, and then the participants are ranked by certain criteria in block 504 by sorting the participant pool database 506. A first participant is selected in block 508, the participant is confirmed in block 510, and added to the participant list 512. If the number of needed participants is not achieved in block 514, the process is repeated. If game time has not arrived in block 516, a waiting period 518 is executed until game time arrives. When game time arrives, the game is started 520. The participant that entered the game parameters may determine the game time, such as by setting a specific time or by merely indicating that the start time has arrived.

The participant selection process begins in block 502. In some embodiments, the game may begin when the appropriate number of participants has been achieved. For example, if the interactive game were a card game with exactly four participants, the game may begin immediately when the last participant was registered. In such a case, the participant selection process 500 would be bypassed completely and the game would commence. If the game were a tournament where the participants must qualify by playing a certain number of games beforehand, the selection process 500 would be applicable.

Participants are ranked in block 504 against some criteria. For example, in preparing for a tournament, the participants may be ranked by their previous scores in previous games. The calculation for a participant's ranking may be determined by the score they achieved against other ranked competitors, with different weights of scores being applied based on the rank of the competitors. Such a calculation is sometimes called a pair-wise ranking. In a simple embodiment, the participants may be ranked based on the time of their entry into the participant's pool with no regard to their previous history. In other embodiments, the ranking may be completely random. Other methods and criteria for ranking of the participants may be developed without violating the scope and intent of the present invention.

The participant pool 506 may be the list of registered participants interested in playing the game or tournament. The list of participants may be more than can be accommodated in the game to be played and broadcast simultaneously. In that event, several games may be played simultaneously and one game may be broadcast while the other ones are played without broadcasting. In other embodiments with several simultaneous games, the broadcast may consist of highlights from several simultaneous games, or several games may be shown in split screen, or the broadcast may switch from game to game depending on who is playing and how well they are doing in the game.

A participant is selected in block 508. The participant may be selected based on the ranking performed in block 504 or may be completely random. The participant may be assigned a team, in the example of a team sport, or may be assigned other variables or qualities for the particular game they have entered. If there are no participants able to play, a virtual participant, with certain artificial intelligence characteristics may be selected as one of the participants. When a participant registers for the game, one of the options may be for the participant to select virtual participants as opponents.

The participant may be confirmed in block 510. In some embodiments, the participant may be offered the chance to decline a particular game with the variables set for him. In other embodiments, the participant may be asked if they still want to play. In still other embodiments, the participant confirmation may not require participant input and may be a verification of the participant's ability within the software program. Another embodiment may not have a verification process at all and bypass this step. In some embodiments, the participant may be confirmed by a simple selection on his interactive television screen or web browser. In other cases, such as a tournament where a large payoff of money is at stake, the participants may be asked to submit a written statement before they are confirmed.

The participant is added to the participant list 512. The participant list may be a team sport wherein each participant is assigned a team, or may be an individual sport wherein one participant competes directly against one other participant. The participant list may be displayed on the participant's screen as the participant list is being filled out.

If there are not enough participants in block 514, the process may continue with the selection and confirmation of a second participant. If there are not enough real participants at this point, a computer generated or virtual participant may be then chosen. A computer-generated participant may have certain characteristics and embedded artificial intelligence that gives the virtual participant more human like characteristics during the play of the game. The type of game being played would determine the characteristics and qualities of a virtual participant.

If the game time has not arrived in block 516, a waiting loop 518 may be used before starting. Broadcast games may require that the game start and end at a specific time of day, thus the waiting period may be necessary. The waiting period may be several seconds to days. In some embodiments, the selection and confirmation process of blocks 508 and 510 may include the selection of a specific game time. The game time may be selected several minutes, hours, or days after the confirmation process. If the participant confirms a game time the following day, the participant may come back a day later to login to the game system and wait for the contest to begin in block 520.

The entire participant selection process 500 may be a computer-generated process that is invisible to the participants. In such a case, the process may be very quick and nearly instantaneous. In the case where the participants must verify their participation, the process may take several minutes. In some embodiments, the process may be held over a period of hours or days as the participants view their choices and respond later. In the case where the participant must submit a written form, the process 500 may last a week or more.

Figure 6:
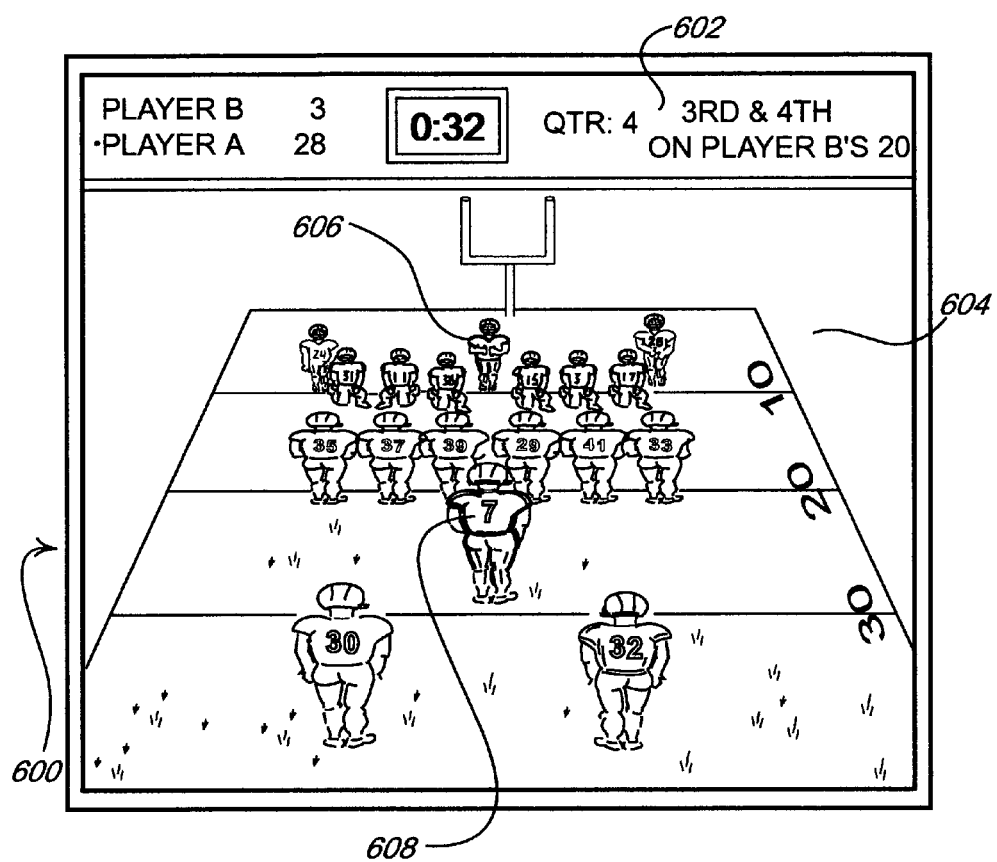
FIG. 6 is an illustration of a screen shot of an embodiment of the present invention showing a broadcast image of an interactive football contest.

FIG. 6 illustrates a screen shot 600 of an embodiment of the present invention wherein the participants are playing a football contest. The screen shot 600 may be the broadcast video image that could be seen on a broadcast channel by any viewer connected to the broadcast network. The viewer of this screen does not need any special registration or login to watch the contest. The screen shot 600 contains the typical elements of a conventional computer generated football game. A banner 602 may display the current game statistics; in this case, Player A is summarily beating Player B with very little time left in the game. The playing area 604 may display the action of the game as it happens. FIGS. 606 and 608 are men on the field that may be controlled by the participants of the interactive game.

Figure 7:
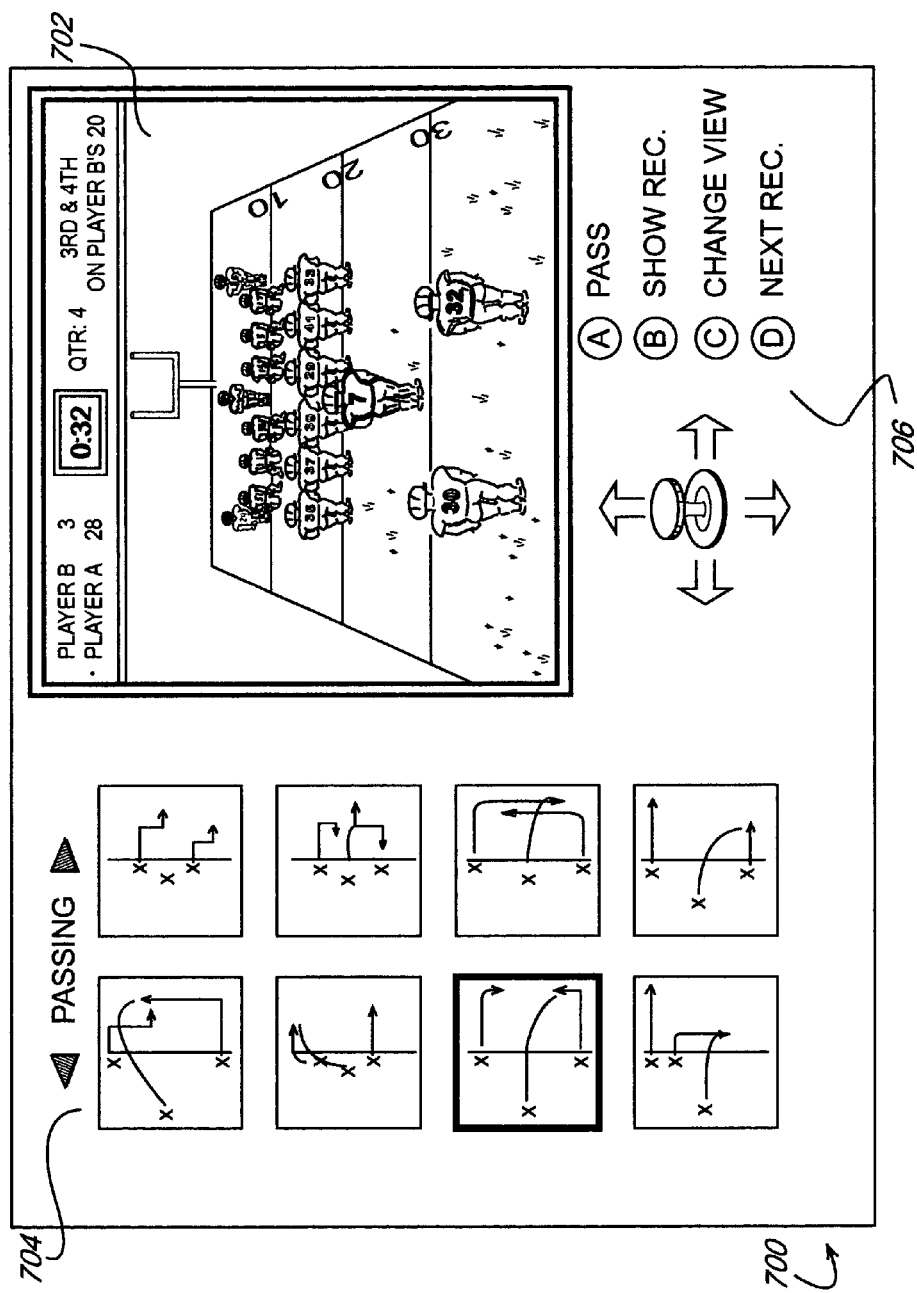
FIG. 7 is an illustration of a screen shot of an embodiment of the present invention showing a user interface of an interactive football contest.

FIG. 7 illustrates a screen shot 700 of an embodiment of the present invention showing the participant's screen. In this embodiment, the participant may have a shrunken image of the broadcast image 702 displayed in the upper right hand corner of the screen. The remainder of the screen may be dedicated to the controls and input that the participant sees. A section 704 of the screen may be dedicated to displaying and selecting plays to be run by the participant. In this case, the participant has selected a play to be run. A section 706 of the screen may be dedicated to displaying the controls used by the participant to operate the quarterback or other player while the action is taking place.

In some embodiments of a football game, the participant may only select plays for his computerized team to execute. Then, the computer system will generate a video signal depicting the action of the plays being executed. In such a game, the participant is a so-called armchair quarterback that is trying to outsmart the opposing participant. Such a game would be typical of an embodiment implemented with a computer network that is not capable of real time play.

In other embodiments, the participant may select a play to be executed, and as the play is executed, the participant may control the movement and play of a single player of the football team in real time. The participant may, for example, move the quarterback into a good throwing position, select an open receiver, and throw the ball to the receiver, all in real time. The feedback loop required for the participant's actions to be fed back to the server computer in real time is much more substantial than if the game did not require a real time input.

In other embodiments, one participant may select a play to be executed, and several participants each control one player on the field in real time, with multiple participants acting in unison as a team of other participants opposing another team of participants. The participants may each move a certain player, such as a wide receiver, into an open area of the field and have the quarterback throw the ball to the receiver. Another participant may be offensive lineman defending the quarterback, who is being played by a third participant, and so on. Such a game would require a network and systems so that the game can be played in real time.

The set top box or other electronic device that is used by the participant as an input device may be able to perform some of the computer processes for the display of the game. For example, if the set top box was able to display an HTML page in the sections 704 and 706, the communication between the set top box and the server computer may be just a short computer command relaying the play to be executed. Such a system would generate a very limited amount of network traffic. Such a set top box may be able to perform the tasks of shrinking the broadcast image and displaying the HTML page.

The set top box may incorporate processing software that is used in conjunction with the software in the server computer to execute the game. For example, the set top box may be operable to run a software package that performs the computations for taking the participant's input, plus the input from the other participant, processing the input and generating a video signal in real time. In this manner, the set top box may give the participants a real time feel to the game with a minimal amount of network traffic.

Other embodiments of sports simulation games, in addition to the present football embodiment include simulated baseball, soccer, hockey, golf, basketball, rugby, cricket, auto racing, motorcycle racing, skateboarding, in line skating, snowboarding, skiing, water skiing, luge racing, bobsledding, boxing, kick boxing, martial arts, sailing, boat racing, figure skating, track and field events, fencing, jousting, horse racing, softball, dodge ball, hurling, tossing the caber, curling, bocce, bowling, duckpin bowling, billiards, snooker, pool, darts, swimming, diving, kayaking, Australian rules football, rounders, cycling, bicycle motocross, speed skating, volleyball, badminton, tennis, racquetball, squash, handball, wallyball, ski jumping, professional wrestling, sumo wrestling, or any other athletic or sporting contest as desired.

Figure 8:
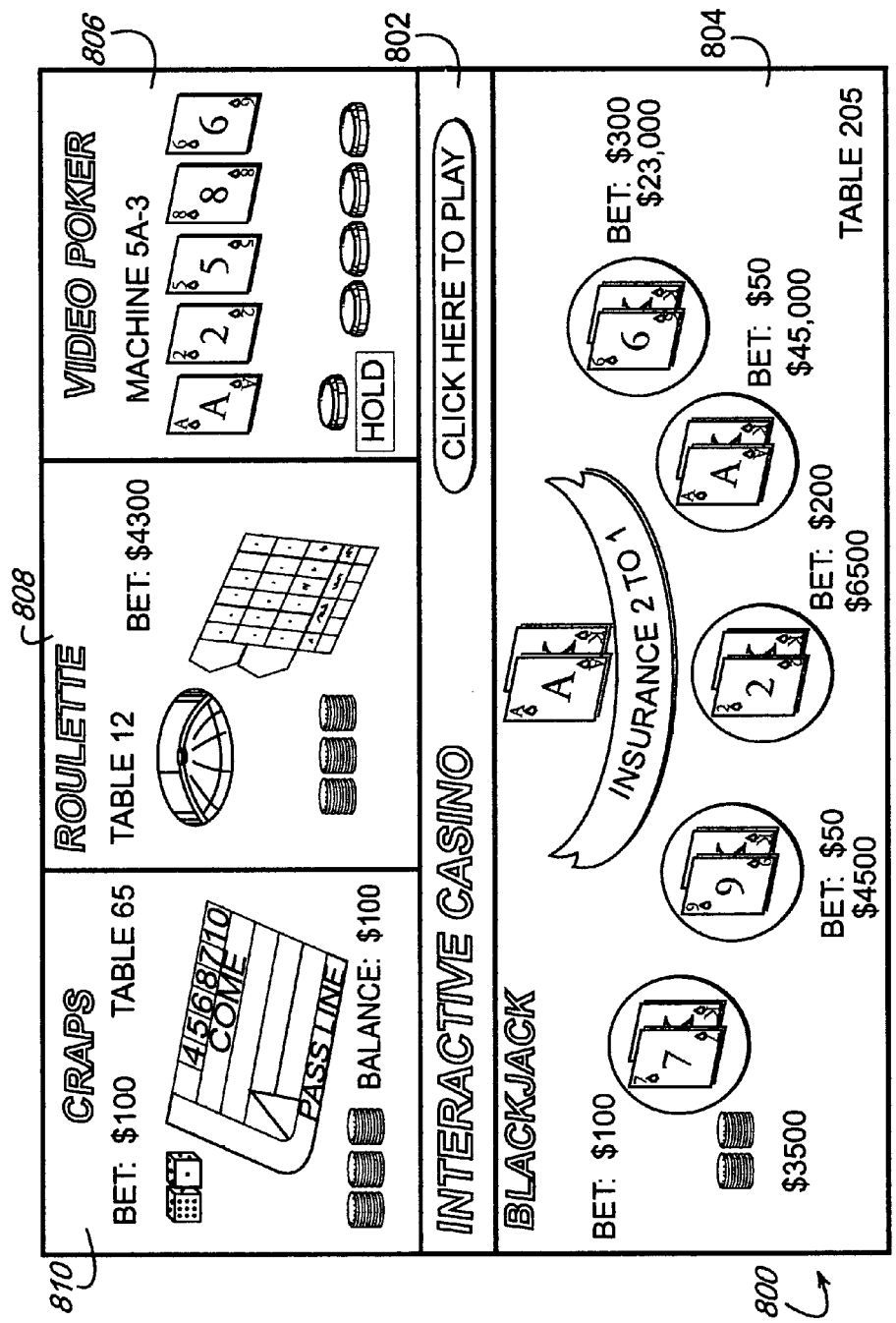
FIG. 8 is an illustration of a screen shot of an embodiment of the present invention showing a broadcast image of an interactive casino game.

FIG. 8 shows a screen shot of a broadcast image of an embodiment of a casino interactive game broadcast image 800. The image 800 is shown broken down into several sections. Section 802 is a banner advertisement to entice the casual viewer to play the interactive game. Sections 804, 806, 808, and 810 are all individual games shown simultaneously on the same screen.

The banner section 802 may be an advertisement to solicit the viewer of the broadcast signal to play the interactive game. The advertisement may have statistics of the best participants, show links to instructions for the games, or have other elements. The advertisement may be a stationary image or may have a dynamic component, such as a rolling or scrolling banner.

The section 804 may show a blackjack table of a live game in progress. The table may be selected at random by the server computer or may be selected based on a certain criteria. Such criteria may be that a particular participant has been on a winning streak of an extended length, the highest bets are being placed at a certain table, the most successful bettors are playing at the same table, or some other criteria. The criteria for the selection may be made known to the participant so that the participant will strive to play so that their table is shown on broadcast television.

Other games, such as shown in sections 806, 808, and 810 are other types of games also shown live in progress. The games shown in the larger section 804 may change or be rotated on a periodic basis or when certain criteria are met, such as when a huge bet pays off.

The audio portion of the broadcast signal may be computer-generated sounds of a casino. Further, the audio portion may include live commentary or audio instructions for enticing the casual viewer to become a participant. Further, the video signal may include a periodic instructional segment wherein a viewer is instructed in the strategies and techniques for playing a particular casino game. During the instructional segment, a live game may be shown in a corner of the screen.

Casino games have been adapted to play using HTML web interfaces. These games may be suited for playing on an interactive system wherein the set top box may be a device operable to display HTML pages on a television screen. The server system may be a web server for the casino games and may also be operable to generate the broadcast video signal. The participant inputs for casino type games may be accomplished with a pointing device or a small keypad and can be transmitted via a small electronic file to the HTML server.

Figure 9:
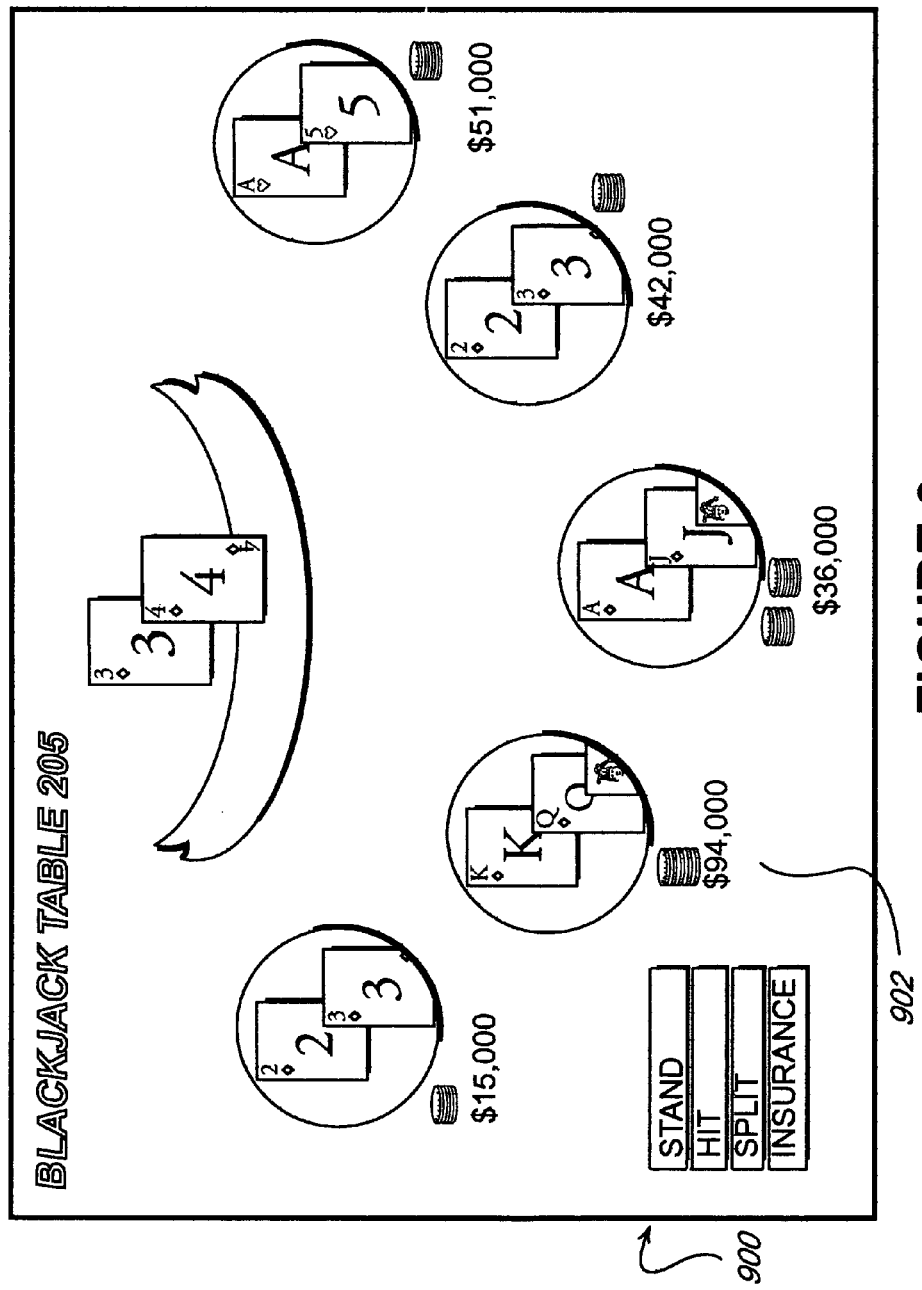
FIG. 9 is an illustration of a screen shot of an embodiment of the present invention showing a user interface of an interactive casino game.

FIG. 9 illustrates a screen shot of an embodiment of a casino game. Screen shot 900 is of a blackjack game and the participant's hand 902 is being played interactively. As in standard blackjack, all of the participants, in this case five participants, place a bet before the hand is dealt. The hand is then dealt, and the participant has only a few options, such as standing, hitting, splitting, or insurance.

The participant may select an option by pointing and clicking on the screen, by pressing a key on a keyboard, or by any other input method. The participant's input may then be relayed to the server system for processing. The data transfer requirements for a casino game like Blackjack is substantially less than a game that requires real time action. For example, the time delay for a message to transfer from the participant's set top box to the server system could be on the order of a second or so for the efficient play of Blackjack, but the time delay for a real time game to be played smoothly may be on the order of low tens of milliseconds or less.

Figure 10:
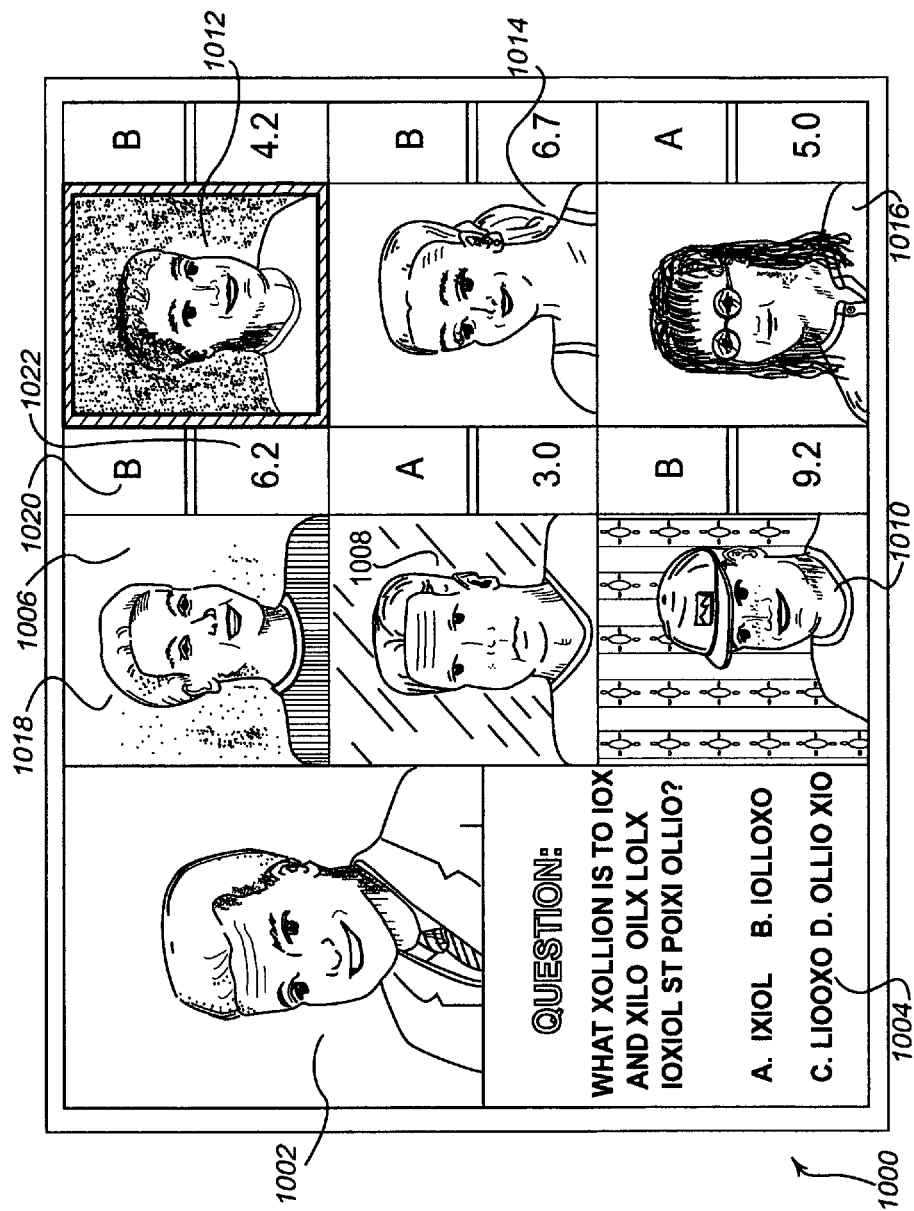
FIG. 10 is an illustration of a screen shot of an embodiment of the present invention showing a broadcast image of an interactive game show.

FIG. 10 illustrates a broadcast screen shot of an embodiment 1000 of a game show played and broadcast simultaneously. A live host of the show is shown in section 1002. A question is asked in section 1004 to which the participants respond. Each participant is displayed, one in each section 1006, 1008, 1010, 1012, 1014, and 1016. Participant in section 1006 is shown live in the box 1018. Further, the participant's answer to the question is shown in box 1020 and the time for the answer is shown in box 1022.

The play of the game in embodiment 1000 may be for six participants to answer a series of questions on the broadcast screen via their set top boxes until a certain number of questions are answered or a certain time has expired. The participants may be selected through a playoff system that is not broadcast. Only those participants who have succeeded in the playoff system may then able to have their pictures broadcast and be eligible for prizes. The playoff system may have a web based interface wherein the participant is asked a series of questions to become eligible, then the participants may be interviewed before playing on live broadcast television.

Once the participants are selected for the broadcast game, the play may continue from round to round, with one or more participants being eliminated until one is left. Other formats for the embodiment may include a round robin play where a series of questions are asked of all the participants, and the winner is the one with the most points at the end. A special bonus round may be played where the participant may compete for a grand prize.

Embodiment 1000 may use a video camera located at the participant's set top box to capture a video image. The set top box may then compress the video image and transmit the image to the server system for processing. The video image may be a live video feed or it may be a single image that is displayed on the broadcast image. Further, the set top box may also include a microphone to collect an audio signal and transmit the audio signal to the server system. The live host of the broadcast game show may be able to interview the participants collectively or individually through the audio and video channels. The director of the broadcast game show may elect to have the names of the participants listed underneath their pictures.

The interface that the participants see may be different from the broadcast video signal. A separate screen, possibly with an HTML interface, may be the method by which the participant actually interfaces with the game. The broadcast may be delayed from live broadcast several seconds, allowing the director a mechanism by which a foul mouthed or inappropriate participant can be censored before the signal is broadcast. Further, the game may be recorded earlier and later broadcast at a more convenient time. It may be desirous to delay the broadcast so that the participants do not have an unfair advantage by viewing the broadcast signal and seeing the other participant's scores or actions. Further, the broadcast signal may be edited from the live signal for content and time.

The set top box may also have an input device, such as a pointing device and/or a keyboard. The contestant may use the input device to enter their answers to the questions. Further, the contestant may be playing the game through a computer terminal equipped with a video camera and a microphone that is connected to the Internet. The bandwidth requirements of the electronic network to support full motion video can be high. The use of smaller video pictures and compression technologies may make the bandwidth requirements less.

The server system in the present embodiment may control the play of the game. The server may create the interface screens and transmit them to the participants. Further, the directions or comments from the live host may be transmitted through the broadcast media or through a secondary channel, such as through the Internet or as a secondary signal merged into the broadcast signal. The server may keep track of the scores of the participants and may compile the broadcast signal from all of the live video signals. Alternatively, the live video signals from the participants may be combined with the live video signals of the host after the signals have left the server system. A live director may direct such a system.

Embodiments of a game-show game may include trivia games, pricing games, games of chance, puzzles, charade games, combination games, and other types of game-show games. Trivia games may involve the participants being asked trivia questions of varying degrees of difficulty. Pricing games may involve the participant guessing the prices of retail items. Games of chance may involve spinning a roulette wheel or other random device. Puzzle games may involve the participant being asked to solve a puzzle. Charade games may involve having one participant giving clues to a second participant who must guess a word or phrase. Combination games may involve one or more elements of any type of game. Other types of game shows may include various tests of intellectual, creative, or athletic abilities. Those skilled in the art of games may be able to expand the list of game shows while keeping within the spirit of the present invention.

In a role-playing embodiment of the present invention, the participants may play a role-playing game, such as a game wherein the participant controls the action of the game in the first person. Examples of role-playing games are combat infantry type games, adventure games, and other games where the participant controls a person or creature in the game by acting in the first person. Each participant in the game may have a unique user interface in terms of the view of the game displayed on each participant's television or computer. Due to a need for real time action, the processing of the participant's video signal may be performed by the set top box with a processor and software operable to take the participant's inputs, plus the inputs from the other participants, and combine the inputs into the game to create the resultant signal. The set top box may further send out the participant's input to the server, which in turn will disperse the collective participant inputs to all of the set top boxes involved with the game. A role-playing game may have one or several participants. In large scale contests, the number of participants may be over one hundred simultaneous participants.

The server for a role-playing game may create a broadcast signal that is a compiled version of the views of the game of one or more participants. Alternatively, the server may create a broadcast signal that is an overview of the game in progress, or the server may create a broadcast signal using both and overview and the first person views of the participants. The server may compile and display statistics for the participants as the participants engage in the contest.

In a strategy-playing embodiment of the present invention, the participants may play a strategy-playing game, such as a game wherein the participant controls an army of infantrymen against and opposing army of another participant or wherein the participant creates a city that grows or shrinks based on the participant's actions. Each participant in the game may or may not have a view of the game that is different from the broadcast image. In some embodiments, the participant may have a unique view wherein the participant can move the displayed image to suit the particular need or want at that time. In other embodiments, the participants both are required to view the same image as is being broadcast.

The set top box for a strategy game may have a processor and software operable to perform all of the calculations necessary for the generation of the video signal. Such a system may be used for strategy games wherein the computations are significant and there is a potential performance problem caused by network throughput. For other embodiments, a server system may be operable to perform all of the calculations necessary to generate and transmit a broadcast signal that is viewed by each participant during the course of the game.

The embodiments herein described all combine interactive game play with the generation and transmittal of a signal that is broadcast to non-participating viewers. In some cases, the purpose of broadcasting the game may be for the pure entertainment of the viewing public, such as for a game show wherein the participants compete on live television for a prize. In other cases, the purpose of broadcasting the game is to entice and solicit participants for interactive games, such as an interactive casino wherein the broadcast of live games entices viewers to gamble.

The embodiments of the various games do not depend on the outcome of events outside of the game, such as the batting averages of professional players, but only the actions of the direct participants of the games and any computer-generated actions. For example, a computer-generated action in a role-playing military game may be for a certain device to explode at a random time. The games embodied herein are specifically not based on the prediction of the outcome of outside events that transpire during the course of play of the game.

The broadcast signals may show a specialized view of the game being played. The broadcast signal may be compiled from several other games, may have live voiceovers by live commentators, and may contain live or taped scenes edited into the broadcast signal. Alternatively, the broadcast signal may be a single view of the game that all of the participants watch as the game progresses.

The participants may view a live broadcast signal as part of the play of the game. In some embodiments, however, the play of the game may be disrupted by the participant's knowledge of the broadcast signal. In such cases, the broadcast signals may be delayed by several seconds or may be taped and broadcast at a later time.

The signal being broadcast may be for a single contest that is part of a larger tournament or league of contests. In other embodiments, a playoff tournament may be broadcast after a season of round robin league play. In still other embodiments, every game may be broadcast.

The various embodiments of the systems may use a set top box that is operative to process participant inputs from several participants and generate a signal for display on each participant's televisions or other displays. In other embodiments, the set top box may be operative only to gather and send input data to the server system. In still other embodiments, the set top boxes may be able to display HTML pages transmitted through the broadcast network and send data using HTML protocol.

The server systems may be the central computational device for the play of a game, wherein all of the participant input is transmitted to the server system that has the processing and computation necessary to operate the game. In some embodiments, the server system may serve as a transfer point for messages and data sent from one set top box to another during the course of the game. In such a system, the server system may be operable to create a broadcast video signal of the game based on the messages sent from the set top boxes.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of implementing an interactive game between two or more players in an interactive environment comprising:
   causing a television advertisement for said interactive game to be included in a television channel within the interactive environment, said television advertisement being selectable by said two or more players to initiate said interactive game;
   in response to selection of said television advertisement via input devices of said two or more players to initiate said interactive game, launching said interactive game on a video game server that controls play of said interactive game and is communicatively coupled to a network;
   generating first markup language code for associating with a video stream, said first markup language code generated by said video game server for communication to a first reception device having or controlling a first display device at a specific address in said interactive environment, said first markup language code comprising a first user interface for a first player of said two or more players;
   generating second markup language code for associating with said video stream, said second markup language code generated by said video game server for communication to a second reception device having or controlling a second display device at another specific address in said interactive environment, said second markup language code comprising a second user interface for a second player of said two or more players;
   receiving at said video game server a game control signal that is generated in response to an input from said first player playing said interactive game, and message data from said first reception device;
   generating video images in response to said game control signal, said video images comprising a first view of said game and a second view of said game, said first view being different from said second view; and
   communicating said video images for association with said video stream; whereby said message data is transferred from said video game server to said second reception device, said first view is communicated to the first reception device and said second view is communicated to the second reception device.

2. The method of claim 1 further comprising displaying player controls in a first portion of a screen viewed by said first player and said video images in a second portion of said screen using said first markup language code.

3. The method of claim 1 wherein said associating of the first markup language code further comprises associating HyperText Markup Language (HTML) code with said video stream.

4. The method of claim 1 further comprising communicating said game control signal to said second player.

5. The method of claim 4 wherein the game control signal is configured to alter an image on the second display device.

6. The method of claim 1 wherein said generating video images further comprises generating video images that are an overview of said interactive video game.

7. The method of claim 1 wherein said interactive environment is one of the group consisting of a cable television network, an over the air broadcast network, the Internet, and a satellite distribution network, and said interactive game is a sports game.

8. The method of claim 1 wherein said interactive environment is one of the group consisting of a cable television network, an over the air broadcast network, the Internet, and a satellite distribution network, and said interactive game is a casino game.

9. The method of claim 1 wherein said interactive environment is one of the group consisting of a cable television network, an over the air broadcast network, the Internet, and a satellite distribution network, and said interactive game is a game show game.

10. The method of claim 1 further comprising assigning the first player or second player to a team.

11. The method of claim 1 wherein said network is one of the group consisting of a cable television network, an over the air broadcast network, the Internet, and a satellite distribution network, and said interactive game is a role playing game.

12. The method of claim 1 wherein said network is one of the group consisting of a cable television network, an over the air broadcast network, the Internet, and a satellite distribution network.

13. The method of claim 1 wherein said second reception device is an electronic device for receiving signals from the network and transferring them for display, the electronic device selected from the group consisting of a set top box, a personal computer, a hand held wireless device, and an Internet appliance.

14. An interactive game system comprising:
one or more servers configured to:
cause a television advertisement for an interactive game to be included in a television channel within an interactive environment, said television advertisement being selectable by two or more players to initiate said interactive game; and
in response to selection of said television advertisement via input devices of said two or more players to initiate said interactive game, execute said interactive game, to control the play of said interactive game by at least two players, and produce video images of said interactive game, said video images comprising a first view of said game and a second view of said game, said first view being different from said second view;
said one or more servers configured to communicate said video images for a network coupled to said one or more servers
in association with a video stream to a plurality of reception devices having or controlling a respective display device of at least one of the at least two players of said interactive game and at least one non-player of said game,
and for communicating at least first markup language code and second markup language code, if any, associated with said video stream, said first markup language code and said second markup language code addressed individually to said reception devices of the at least two players,
said first markup language code providing a first user interface for a first player; and
said second markup language code providing a second user interface for a second player;
said one or more servers further configured to receive a data message from said first reception device and transfer said data message to said second reception device and to transfer said first view to said first reception device and said second view to said second reception device.

15. The interactive game system of claim 14 wherein said first markup language code is HyperText Markup Language (HTML) code.

16. The interactive game system of claim 14 further comprising second video images that are associated with said video images and said first and second markup language code, if any, as part of said video stream.

17. The interactive game system of claim 14 further comprising an interactive television system that communicates an input received from said first player at said first reception device to said one or more servers.

18. The interactive game system of claim 17 wherein said network that communicates an input received from said first player at said first reception device comprises a back-channel in said network.

19. The interactive game system of claim 17 wherein said network that communicates an input received from said first player at said first reception device comprises a connection to one of the group consisting of a cable television network, an over the air broadcast network, a satellite distribution network, and the Internet.

20. The interactive game system of claim 14 wherein said first markup language code further comprises code that displays a user interface in a first portion of a display screen and that displays said video images in a second portion of said display screen.

21. The interactive game system of claim 14 wherein said first markup language code further comprises code that produces a first graphical image of said game in said first reception device.

22. The interactive game system of claim 21 wherein said second markup language code further comprises code that produces a second graphical image of said game, that differs from said first graphical image of said game, in said second reception device.

23. The interactive game system of claim 14 wherein said network is one of the group consisting of a cable television network, an over the air broadcast network, the Internet, and a satellite distribution network, and said interactive game is a sports game.

24. The interactive game system of claim 14 wherein said network is one of the group consisting of a cable television network, an over the air broadcast network, the Internet, and a satellite distribution network, and said interactive game is a casino game.

25. The interactive game system of claim 14 wherein said network is one of the group consisting of a cable television network, an over the air broadcast network, the Internet, and a satellite distribution network, and said interactive game is a game show game.

26. The method of claim 14 wherein said network is one of the group consisting of a cable television network, an over the air broadcast network, the Internet, and a satellite distribution network, and said interactive game is a role playing game.

27. The method of claim 14 wherein said network is one of the group consisting of a cable television network, an over the air broadcast network, the Internet, and a satellite distribution network.

28. The method of claim 14 wherein said second reception device is an electronic device for receiving signals from the network and transferring them for display, the electronic device selected from the group consisting of a set top box, a personal computer, a hand held wireless device, and an Internet appliance.

29. An interactive game system comprising:
one or more servers configured to:

cause a television advertisement for an interactive game to be included in a television channel within an interactive environment, said television advertisement being selectable by two or more players to initiate said interactive game; and in response to selection of said television advertisement via input devices of said two or more players to initiate said interactive game, execute said interactive game, to control play of said interactive game, and produce video images of said interactive game, said video images comprising a first view of said game, a second view of said game, and a third view of said game, each of said views being different from each of the other of said views;

said one or more servers coupled to a network for communicating a video stream containing said video images to a plurality of reception devices having or controlling a respective display device communicatively coupled to said network, including reception devices of at least two players of said interactive game and at least one non-player of said game, and for communicating associated markup language code, if any, addressed individually to a first of said plurality of reception devices that receives said first view of said video stream and that acquires first markup language code addressed to said first of said plurality of reception devices wherein said first markup language code is associated with said video stream and provides a first user interface for a first of said at least two players, and a second of said plurality of reception devices that receives said second view of said video stream and that acquires second markup language code addressed to said second of said plurality of reception devices wherein said second markup language code is associated with said video stream and provides a second user interface for a second of said at least two players, and a third of said plurality of reception devices that receives said third view of said video stream and that outputs said video images to a display device of said at least one non-player of the game, wherein said one or more servers is further configured to receive a data message from said first of said plurality of reception devices and transfer said data message to said second of said plurality of reception devices; and transmit different ones of the video images for the players and for the at least one non-player of the game;

wherein registration of at least one of the at least two players is solicited through an advertisement.

30. The interactive game system of claim 29 wherein the first player or second player is assigned to a team.

31. The method of claim 29 wherein said network is one of the group consisting of a cable television network, an over the air broadcast network, the Internet, and a satellite distribution network, and said interactive game is a role playing game.

32. The method of claim 29 wherein said network is one of the group consisting of a cable television network, an over the air broadcast network, the Internet, and a satellite distribution network.

33. The method of claim 29 wherein said second reception device is an electronic device for receiving signals from the network and transferring them for display, the electronic device selected from the group consisting of a set top box, a personal computer, a hand held wireless device, and an Internet appliance.

34. An interactive game system for producing signals for playing an interactive game between at least two players of said interactive game, said interactive game viewable by at least one additional viewer of said interactive game that is not a participant in said game, said system comprising:

a server system configured for causing a television advertisement for said interactive game to be included in a television channel within an interactive environment, said television advertisement being selectable by said at least two players to initiate said interactive game;

in response to selection of said television advertisement via input devices of said two or more players to initiate said interactive game, running said interactive game and producing video images of said game, said video images comprising a first view of said game, a second view of said game, and a third view of the game, wherein each of said views is different from each of the other of said views; and generating markup language code for associating with a video signal including said video images, said markup language code addressed to at least three reception devices having or controlling a respective display device, said video signal for communicating by a network, to said at least three reception devices including at least a first of the at least three reception devices receiving said first view of said video signal from said network and acquiring first markup language code associated with said video signal and addressed to said first reception device, said first markup language code comprising a user interface for a first player of said at least two players, a second of the at least three reception devices receiving said second view of said video signal from said network and acquiring second markup language code associated with said video signal and addressed to said second reception device, said second markup language code comprising a user interface for a second player of said at least two players, and a third of said at least three reception devices receiving said third view of said video signal from said network and presenting said video images to said at least one additional viewer that is not a participant in said game, said markup language code including code, if any, that is necessary for said at least two players to play said game.

35. The interactive game system of claim 34 further comprising a network that transfers a signal generated in response to an input from said first player from said first of said at least three reception devices to said server system.

36. The interactive game system of claim 34 wherein said network is one of the group consisting of a cable television network, an over the air broadcast network, the Internet, and a satellite distribution network, and said interactive game is a sports game.

37. The method of claim 36 wherein said third reception device is an electronic device for receiving signals from the network and transferring them for display, the electronic device selected from the group consisting of a set top box, a personal computer, a hand held wireless device, and an Internet appliance.

38. The interactive game system of claim 34 wherein said network is one of the group consisting of a cable television network, an over the air broadcast network, the Internet, and a satellite distribution network, and said interactive game is a casino game.

39. The interactive game system of claim 34 wherein said network is one of the group consisting of a cable television network, an over the air broadcast network, the Internet, and a satellite distribution network, and said interactive game is a game show game.

40. The interactive game system of claim 34 wherein said network is one of the group consisting of a cable television network, an over the air broadcast network, the Internet, and a satellite distribution network, and said interactive game is a role playing game.

41. The method of claim 34 wherein said network is one of the group consisting of a cable television network, an over the air broadcast network, the Internet, and a satellite distribution network.

42. The method of claim 34 wherein said third reception device is an electronic device for receiving signals from the network and transferring them for display, the electronic device selected from the group consisting of a set top box, a personal computer, a hand held wireless device, and an Internet appliance.

43. A non-transitory computer-readable storage medium having embedded therein a set of instructions which, when executed by one or more processors of a computer causes the computer to execute operations comprising:
   causing a television advertisement for an interactive game to be included in a television channel within an interactive environment, said television advertisement being selectable by at least two players to initiate said interactive game;
   using at least one server and in response to selection of said television advertisement via input devices of said two or more players to initiate said interactive game, launching said interactive game;
   generating first markup language code for associating with a video stream, said first markup language code for communication to a first receiver at a specific address in a network, said first markup language code comprising a user interface for a first player of said at least two players;
   generating second markup language code for associating with said video stream, said second markup language code for communication to a second receiver at another specific address in said network, said second markup language code comprising a user interface for a second player of said at least two players;
   receiving a game control signal that is generated in response to an input from said first player, and message data from said first receiver;
   generating video images in response to said game control signal, said video images comprising a first view of said game, a second view of said game, and a third view of the game, each of said views being different from each of the other of said views; and
   communicating said video images for association with said video stream;
   whereby said message data is communicated to said second receiver, and said video stream is communicated to a plurality of receivers including receivers of said at least a first player and a second player, the first player receiving said first view and said second player receiving said second view, and of at least one nonparticipating viewer, said at least one nonparticipating viewer receiving said third view.

44. A method of implementing an interactive game between at least two players in a network, the method comprising:
   causing a television advertisement for interactive game to be included in a television channel within an interactive environment, said television advertisement being selectable by said at least two players to initiate said interactive game;
   in response to selection of said television advertisement to initiate said interactive game, launching said interactive game on a video game server communicatively coupled to said network;
   generating first markup language code for associating with a video stream, said first markup language code generated by said server for communication as a user interface for a first player of said at least two players;
   generating second markup language code for associating with said video stream, said second markup language code generated by said server for communication as a user interface for a second player of said at least two players;
   receiving at said video game server a game control signal that is generated in response to an input signal from said first player, and message data from a first reception device used by said first player;
   generating video images in said video game server in response to said control signal, said video images comprising a first view of said game, a second view of said game, and a third view of the game, each of said views being different from each of the other of said views; and
   communicating said video images for association with said video stream; whereby said message data is communicated from said server to a second reception device used by said second player and said video stream is communicated to said reception devices.

45. The method of claim 44 wherein the network is one of the group consisting of a cable television network, an over the air broadcast network, the Internet, and a satellite distribution network, and said game is one of the group consisting of a sports game, a casino game, a game show game and a role playing game.

46. The method of claim 44 wherein said second reception device is an electronic device for receiving signals from the television broadcast system and transferring them for display, the electronic device selected from the group consisting of a set top box, a personal computer, a hand held wireless device, and an Internet appliance.

47. A non-transitory computer-readable storage medium having embedded therein a set of instructions which, when executed by one or more processors of a computer causes the computer to execute operations comprising:
   causing a television advertisement for an interactive game to be included in a television channel within an interactive environment, said television advertisement being selectable by at least two players to initiate said interactive game;
   using a computer processor and in response to selection of said television advertisement via input devices of said two or more players to initiate said interactive game, launching said interactive game;
   generating first markup language code for associating with a video stream, said first markup language code for communication to a first reception device having or controlling a display device at a specific address in a network, said first markup language code comprising a user interface for a first player of said at least two players;
   generating second markup language code for associating with said video stream, for communication to a second reception device having or controlling a display device at another specific address in said network, said second markup language code comprising a user interface for a second player of said at least two players;

receiving a game control signal that is generated in response to an input from said first player, and message data from said first reception device;

generating video images in said video game server in response to said control signal, said video images comprising a first view of said game, a second view of said game, and a third view of the game, wherein each of said views is different from each of the other of said views; and communicating said video images for association with said video stream; whereby said message data is communicated from said video game server to said second reception device and a respective one of said views of said video stream is communicated to a respective one of each of the reception devices of said at least two players.

48. The computer-readable medium of claim 47 wherein the network is one of the group consisting of a cable television network, an over the air broadcast network, the Internet, and a satellite distribution network, and said game is one of the group consisting of a sports game, a casino game, a game show game and a role playing game.

49. The method of claim 47 wherein said second reception device is an electronic device for receiving signals from the television broadcast system and transferring them for display, the electronic device selected from the group consisting of a set top box, a personal computer, a hand held wireless device, and an Internet appliance.

* * * * *

UNITED STATES PATENT AND TRADEMARK OFFICE
CERTIFICATE OF CORRECTION

PATENT NO.         : 8,932,136 B2               Page 1 of 1
APPLICATION NO.    : 09/939306
DATED              : January 13, 2015
INVENTOR(S)        : Lemmons et al.

It is certified that error appears in the above-identified patent and that said Letters Patent is hereby corrected as shown below:

In The Claims

In column 19, line 40, in Claim 14, delete "game," and insert --game--, therefor In column 21, line 9, in Claim 29, delete "game," and insert --game--, therefor In column 24, line 6, in Claim 44, before "to", insert --via input devices of said two or more players--, therefor Signed and Sealed this
Thirtieth Day of June, 2015

Michelle K. Lee
*Director of the United States Patent and Trademark Office*